(12) United States Patent
Ikefuji

(10) Patent No.: US 10,530,187 B2
(45) Date of Patent: Jan. 7, 2020

(54) NON-CONTACT POWER SUPPLY SYSTEM

(71) Applicant: Rohm Co., Ltd., Kyoto (JP)

(72) Inventor: Yoshihiro Ikefuji, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 171 days.

(21) Appl. No.: 15/546,738

(22) PCT Filed: Dec. 3, 2015

(86) PCT No.: PCT/JP2015/084000
§ 371 (c)(1),
(2) Date: Jul. 27, 2017

(87) PCT Pub. No.: WO2016/121222
PCT Pub. Date: Aug. 4, 2016

(65) Prior Publication Data
US 2018/0019618 A1 Jan. 18, 2018

(30) Foreign Application Priority Data
Jan. 28, 2015 (JP) ................. 2015-014472

(51) Int. Cl.
*H02J 50/12* (2016.01)
*H02J 7/02* (2016.01)
*H02J 7/04* (2006.01)

(52) U.S. Cl.
CPC .............. *H02J 50/12* (2016.02); *H02J 7/025* (2013.01); *H02J 7/04* (2013.01)

(58) Field of Classification Search
CPC .. H02J 50/10; H02J 50/12; H02J 5/005; H02J 17/00
(Continued)

(56) References Cited

U.S. PATENT DOCUMENTS

2007/0216392 A1 9/2007 Stevens et al.
2007/0228833 A1* 10/2007 Stevens .................. H02J 5/005
307/45

(Continued)

FOREIGN PATENT DOCUMENTS

EP 1751834 A1 2/2007
JP 2011-507481 3/2011
(Continued)

OTHER PUBLICATIONS

Japan Patent Office, International Search Report for PCT/JP2015/084000, dated Feb. 9, 2016 (with English translation).
(Continued)

*Primary Examiner* — David V Henze-Gongola
(74) *Attorney, Agent, or Firm* — Fish & Richardson P.C.

(57) ABSTRACT

Disclosed is a non-contact power supply system wherein power is transmitted by means of a magnetic field resonance method from a power transmission device, which includes a power transmission-side resonant circuit, to a power reception device, which includes a power reception-side resonant circuit. The power transmission device detects, at the time of transmitting the power, a load in the power transmission, and stops the power transmission in the cases where a detection result deviates from a specified normal range. In the power reception device, a power stabilization circuit (270) that maintains output power of the power reception circuit constant is provided between a load circuit (280) and a power reception circuit (230) that outputs, toward the load circuit, power on the basis of power received by the power reception-side resonant circuit.

9 Claims, 24 Drawing Sheets

(58) Field of Classification Search
USPC .......................................... 320/108; 307/104
See application file for complete search history.

(56) References Cited

U.S. PATENT DOCUMENTS

| | | |
|---|---|---|
| 2009/0134713 A1 | 5/2009 | Stevens et al. |
| 2009/0322158 A1 | 12/2009 | Stevens et al. |
| 2011/0006613 A1 | 1/2011 | Stevens et al. |
| 2011/0285210 A1 | 11/2011 | Lemmens et al. |
| 2011/0285214 A1 | 11/2011 | Stevens et al. |
| 2011/0291491 A1 | 12/2011 | Lemmens et al. |
| 2012/0001493 A1 | 1/2012 | Kudo et al. |
| 2012/0068536 A1 | 3/2012 | Stevens et al. |
| 2012/0175967 A1 | 12/2012 | Dibben et al. |
| 2014/0001877 A1 | 1/2014 | Stevens et al. |
| 2014/0035521 A1 | 2/2014 | Endo |
| 2014/0077615 A1 | 3/2014 | Stevens et al. |
| 2014/0239893 A1 | 8/2014 | Akiyoshi et al. |
| 2014/0333146 A1 | 11/2014 | Dibben et al. |
| 2015/0054354 A1 | 2/2015 | Lemmens et al. |
| 2015/0270718 A1* | 9/2015 | Hwang ................ H04B 5/0037 307/104 |
| 2016/0241088 A1 | 8/2016 | Stevens et al. |
| 2016/0013683 A1 | 11/2016 | Endo |
| 2017/0085135 A1 | 3/2017 | Stevens et al. |

FOREIGN PATENT DOCUMENTS

| | | |
|---|---|---|
| JP | 2014-007863 | 1/2014 |
| JP | 2014-033504 | 2/2014 |
| JP | 2014-225984 | 12/2014 |

OTHER PUBLICATIONS

Extended EP search report, in EP application No. 15880114.2 dated (May 18, 2018).

* cited by examiner

SEPARATE STATE

REFERENCE PLACEMENT STATE

VOLTAGE DROP OF SENSE RESISTOR

REFERENCE PLACEMENT STATE | SEPARATE STATE | REFERENCE PLACEMENT STATE

FIG.10
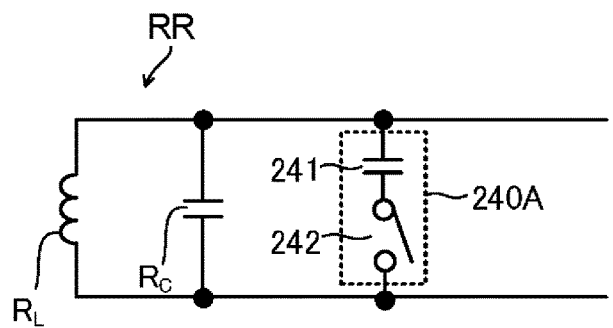
FIG.11
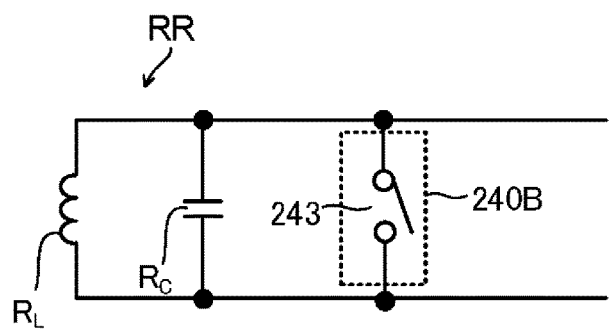
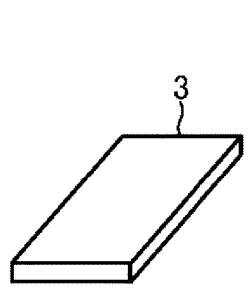
FIG.12A
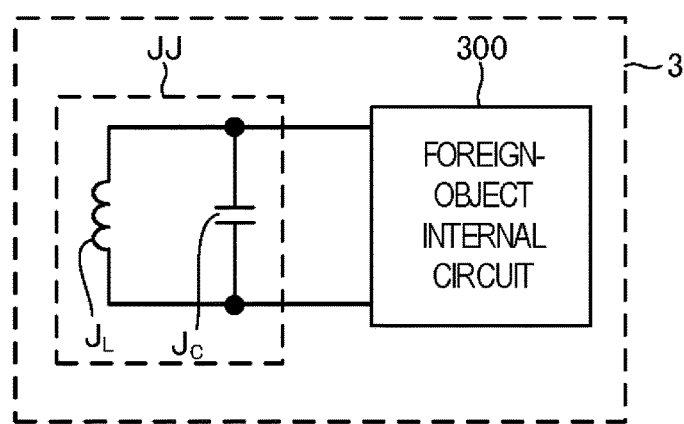
FIG.12B

FIG.13
INITIAL SETTING PROCESS
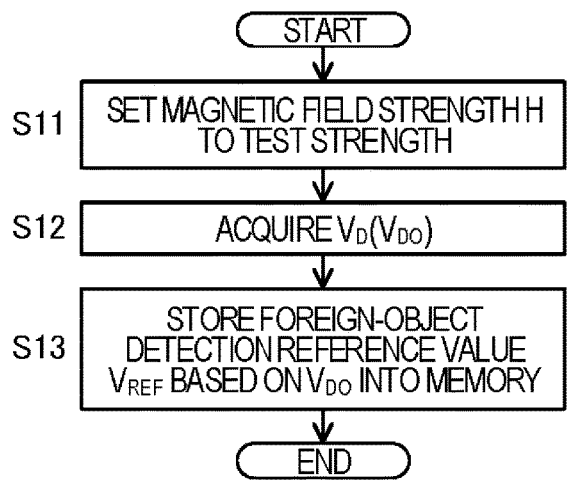
FIRST CASE  SECOND CASE  THIRD CASE  FOURTH CASE
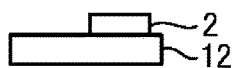 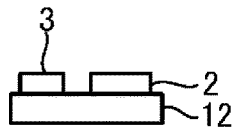 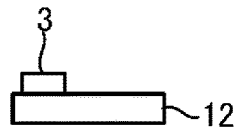 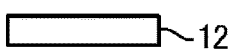
FIG.14A  FIG.14B  FIG.14C  FIG.14D
FIG.15
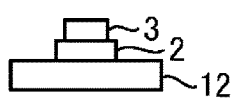

OPERATION OF POWER SUPPLY DEVICE

FIG.22
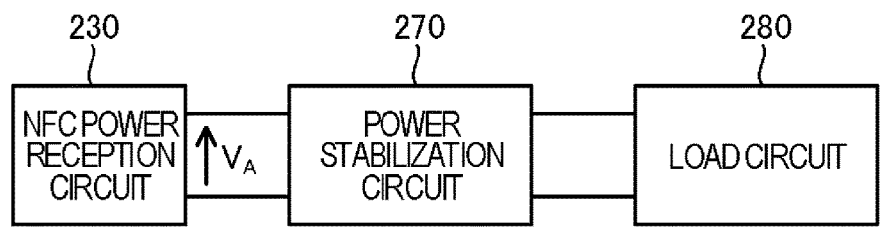
FIRST EXAMPLE OF LOAD CIRCUIT
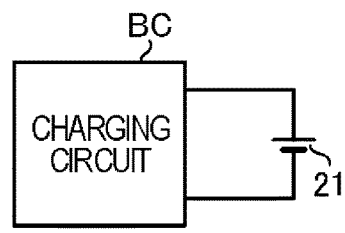
FIG.23A
SECOND EXAMPLE OF LOAD CIRCUIT
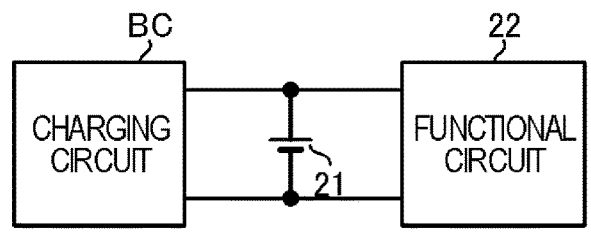
FIG.23B

NON-CONTACT POWER SUPPLY SYSTEM

TECHNICAL FIELD

The present invention relates to a non-contact power supply system.

BACKGROUND ART

As a kind of short-range wireless communications, wireless communications by NFC (Near Field Communication) using 13.56 MHz as a carrier frequency are available. Meanwhile, also proposed is a technique of performing non-contact power supply by a magnetic field resonance method with use of coils that are used for NFC communications.

For the non-contact power supply with use of magnetic field resonance, a power transmission-side resonant circuit including a power transmission-side coil is placed in a power supply device while a power reception-side resonant circuit including a power reception-side coil is placed in an electronic device as a power reception device, where resonance frequencies of those resonant circuits are set to a common reference frequency. With this arrangement, an AC current is passed through the power transmission-side coil so that an alternating magnetic field of the reference frequency is generated in the power transmission-side coil. Then, the alternating magnetic field is transferred to the power reception-side resonant circuit that resonates at the reference frequency, causing an AC current to flow through the power reception-side coil. That is, electric power is transferred from the power transmission-side resonant circuit including the power transmission-side coil to the power reception-side resonant circuit including the power reception-side coil.

LIST OF CITATIONS

Patent Literature

PTL 1: JP 2014-33504 A

SUMMARY OF THE INVENTION

Problem to be Solved by the Invention

Generally, only an electronic device compatible with a power supply device is set on a power supply base (power supply mat or power supply cradle) of the power supply device, allowing desired power supply (power transfer) to be implemented. However, it may occur that some foreign object incompatible with the power supply device is erroneously be placed on the power supply base. The foreign object in this case is, for example, an object (card or the like) having a wireless IC tag including an antenna coil of 13.56 MHz irresponsive to NFC communications. Another example of the foreign object is an electronic device having an NFC communication function itself which is, however, invalidated by switch. A smartphone having the NFC communication function, in which the function is turned off by software setting, as an example, can be a foreign object. Even a smartphone having the NFC communication function validated, but having no power reception function is classified as a foreign object.

With such a foreign object placed on the power supply base, in case the power supply device executes power transmission operation, the foreign object may be broken by a ferromagnetic field generated by the power transmission-side coil. For example, a ferromagnetic field under power transmission operation may cause a coil terminal voltage of the foreign object on the power supply base to increase to 100 V to 200 V such that the foreign object, unless formed resistant to such high voltages, may be broken.

Also, the electronic device may be taken away from the power supply base during power transmission. Continuing the power transmission operation in this case would result in a waste of electric power.

In terms of protecting foreign objects or suppressing wasteful power consumption, it can be conceived that a magnitude of a load involved in power transmission is detected by the power supply device and power transmission control is exerted in response to a result of the detection. For example, it can be conceived that while the load magnitude in power transmission (load magnitude for the power transmission-side coil) is monitored during power transmission, power transmission is stopped upon detection that the load magnitude has deviated from a specified normal range due to placement of a foreign object, removal of the electronic device from the power supply base, or the like.

However, on the power supply device side, the load magnitude during power transmission is increased and decreased with increasing and decreasing power consumption of an electronic device-side circuit that consumes received power. Accordingly, when such power transmission control as described above is exerted, there arises a fear for a possibility that the control circuit on the power supply device side may malfunction (exert power transmission control that essentially should not be performed). That is, for example, it is feared that the control circuit may stop the power transmission under such circumstances as power transmission should not be stopped.

Moreover, it is also of importance to suppress such malfunctions as could occur due to noise or transient load variations.

It is therefore an object of the present invention to provide a non-contact power supply system that contributes to optimization of power transmission control.

Means for Solving the Problem

A first non-contact power supply system according to the present invention is a non-contact power supply system capable of transmitting electric power by a magnetic field resonance method from a power transmission device including a power transmission-side resonant circuit to a power reception device including a power reception-side resonant circuit, wherein the power transmission device includes: a load detection circuit arranged to detect a magnitude of a load in the power transmission; and a control circuit arranged to perform power transmission control based on a detection result of the load detection circuit, and wherein the power reception device includes: a load circuit; a power reception circuit arranged to output, toward the load circuit, electric power based on received electric power received by the power reception-side resonant circuit; and a suppressor circuit interposed between the power reception circuit and the load circuit and arranged to suppress variations in output power of the power reception circuit due to variations in power consumption of the load circuit.

Preferably, as a specific example, in the first non-contact power supply system, the load detection circuit detects an amplitude of a current flowing through a power transmission-side coil forming the power transmission-side resonant circuit to thereby detect the magnitude of the load in the power transmission, and the control circuit, during execution of the power transmission, controls continuation or stop of the power transmission in response to detection result information as to the amplitude.

Preferably, as a more specific example, in the first non-contact power supply system, when detection result information as to the amplitude deviating from a specified range is obtained during execution of the power transmission, the control circuit stops the power transmission, and otherwise permits continuation of the power transmission.

As an example in this case, in the first non-contact power supply system, the detection result information may be information obtained by subjecting a detected value of the amplitude to high-range reduction process.

As another example, the first non-contact power supply system may be enabled to perform, in time division, power transfer operation composed of power transmission by the power transmission device and power reception by the power reception device, and communication operation of performing communications between the power transmission device and the power reception device, wherein the power reception device may further include a current detection circuit arranged to detect a value of a current flowing within the load circuit to affect power consumption of the load circuit, and wherein the control circuit of the power transmission device, upon receiving power reception-side information responsive to a detection result of the current detection circuit from the power reception device through the communication operation, may adjust a generated magnetic-field strength of the power transmission-side coil in the power transfer operation on a basis of the power reception-side information.

Preferably, as an example in this case, in the first non-contact power supply system, the control circuit of the power transmission device receives the power reception-side information periodically by the communication operation.

Otherwise, for example, in the first non-contact power supply system, after the operation of the non-contact power supply system is switched over from the power transfer operation to the communication operation in response to a detected current value of the current detection circuit during the power transfer operation, the power reception-side information may be transferred to power transmission device by communication operation subsequent to the switchover, and the control circuit of the power transmission device, based on the transferred power reception-side information, may adjust the generated magnetic-field strength of the power transmission-side coil in the subsequent power transfer operation.

As another example, in the first non-contact power supply system, the load circuit may include a secondary battery, and a charging circuit arranged to charge the secondary battery on a basis of electric power supplied from the power reception circuit via the suppressor circuit, and the current detection circuit may detect a charging current value for the secondary battery.

Otherwise, for example, in the first non-contact power supply system, the load circuit may include a secondary battery, a charging circuit arranged to charge the secondary battery on a basis of electric power supplied from the power reception circuit via the suppressor circuit, and a functional circuit driven by using output power of the secondary battery, and the current detection circuit may detect an input current value for the load circuit.

A second non-contact power supply system according to the present invention is a non-contact power supply system capable of transmitting electric power by a magnetic field resonance method from a power transmission device including a power transmission-side resonant circuit to a power reception device including a power reception-side resonant circuit, wherein the power reception device includes: a load circuit; and a power reception circuit arranged to output, toward the load circuit, electric power based on received electric power received by the power reception-side resonant circuit, and wherein the power transmission device includes: a load detection circuit arranged to detect a magnitude of a load in the power transmission; and a control circuit arranged to perform power transmission control based on information obtained by subjecting a detection result of the magnitude of the load to high-range reduction process.

Preferably, as a specific example, in the second non-contact power supply system, the load detection circuit detects an amplitude of a current flowing through a power transmission-side coil forming the power transmission-side resonant circuit to thereby detect the magnitude of the load in the power transmission, and the control circuit controls continuation or stop of the power transmission on a basis of detection result information obtained by subjecting a detected value of the amplitude to the high-range reduction process during execution of the power transmission.

Preferably, as a more specific example, in the second non-contact power supply system, when the detection result information deviating from a specified range is obtained during execution of the power transmission, the control circuit stops the power transmission, and otherwise permits continuation of the power transmission.

Advantageous Effects of the Invention

According to the present invention, there can be provided a non-contact power supply system that contributes to optimization of power transmission control.

BRIEF DESCRIPTION OF DRAWINGS

FIG. 10 is a circuit diagram showing an example of a resonant-state changing circuit according to the first embodiment of the invention;

FIG. 11 is a circuit diagram showing another example of the resonant-state changing circuit according to the first embodiment of the invention;

FIGS. 12A and 12B are a schematic outline diagram and a schematic internal configuration diagram, respectively, of a foreign object according to the first embodiment of the invention;

FIG. 13 is an operational flowchart of an initial setting process to be executed in the power supply device;

FIGS. 14A to 14D are views illustrating placement relationships among a power supply base, the electronic device, and the foreign object;

FIG. 15 is a view showing a placement relationship among the power supply base, the electronic device, and the foreign object;

FIG. 22 is a partial block diagram of the electronic device according to the second embodiment of the invention;

FIGS. 23A and 23B are diagrams showing configuration examples of the load circuit of FIG. 22;

Description of Embodiments

Hereinbelow, exemplary embodiments of the present invention will be described in detail with reference to the accompanying drawings. Throughout the individual drawings for reference, like component members are designated by like reference signs, and overlapping descriptions about like component members will be omitted in principle. In addition, hereinafter, symbols or signs that refer to information, signals, physical quantities, state quantities, component members, and the like may be described for simplified description's sake, while designations of information, signals, physical quantities, state quantities, component members, and the like corresponding to those symbols or signs may be omitted or abbreviated. Further, in any arbitrary ones among later-described flowcharts, a plurality of processes at any arbitrary plurality of steps may be changed arbitrarily in order of execution or executed in parallel unless such changes and parallelizations cause contradictions among processing contents.

<<First Embodiment>>

Figure 1A:
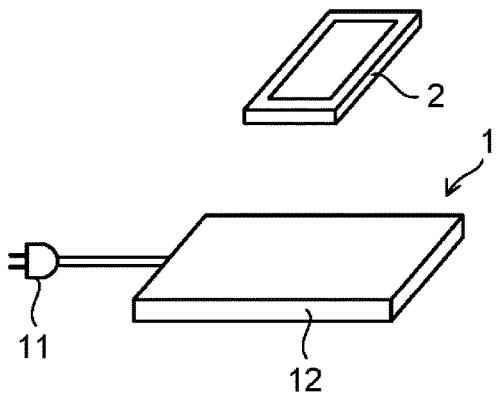
FIGS. 1A and 1B are schematic appearance views of a power supply device and an electronic device according to a first embodiment of the present invention.
Figure 1B:
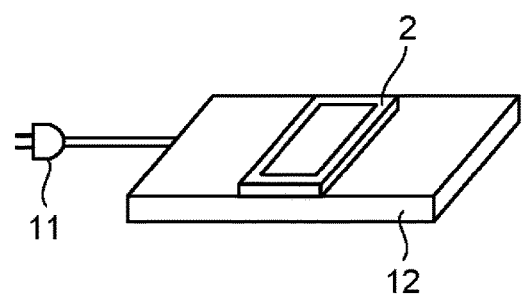

A first embodiment of the present invention will be described below. FIGS. 1A and 1B are schematic appearance views of a power supply device 1 and an electronic device 2 according to the first embodiment. In more detail, FIG. 1A is an appearance view of the power supply device 1 and the electronic device 2 in their mutually separate state, and FIG. 1B is an appearance view of the power supply device 1 and the electronic device 2 in their reference placement state. Definitions of the separate state and the reference placement state will be detailed later. The power supply device 1 and the electronic device 2 constitute a non-contact power supply system. The power supply device 1 includes a power plug 11 for receiving commercial AC power, and a power supply base 12.

Figure 2A:
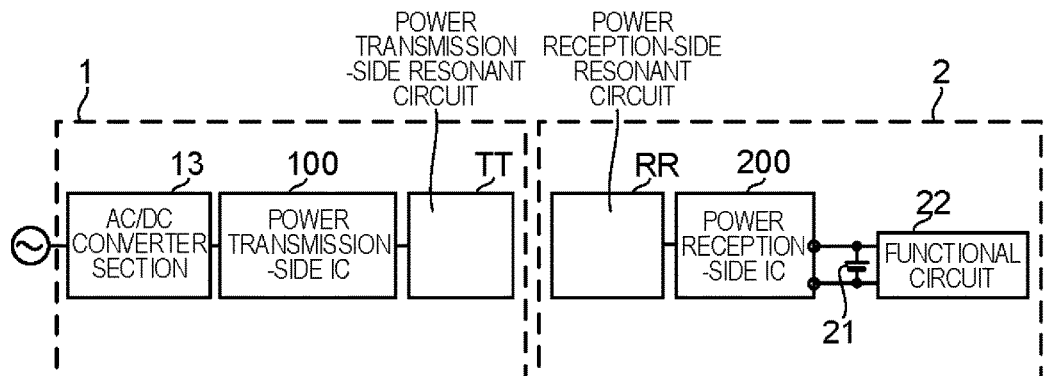
FIGS. 2A and 2B are schematic internal configuration diagrams of the power supply device and the electronic device, respectively, according to the first embodiment of the invention.

FIG. 2A shows a schematic internal configuration diagram of the power supply device 1 and the electronic device 2. The power supply device 1 includes an AC/DC converter section 13 arranged to generate and output a DC voltage having a specified voltage value from a commercial AC voltage inputted via the power plug 11, a power transmission-side IC 100 (hereinafter, referred to also as IC 100) that is an integrated circuit to be driven on an output voltage of the AC/DC converter section 13, and a power transmission-side resonant circuit TT (hereinafter, referred to also as resonant circuit TT) connected to the IC 100. The AC/DC converter section 13, the power transmission-side IC 100, and the resonant circuit TT may be placed within the power supply base 12. A circuit driven by using the output voltage of the AC/DC converter section 13 may be provided in the power supply device 1, in addition to the IC 100.

The electronic device 2 includes a power reception-side IC 200 (hereinafter, referred to also as IC 200) that is an integrated circuit, a power reception-side resonant circuit RR (hereinafter, referred to also as resonant circuit RR) connected to the IC 200, a battery 21 that is a secondary battery, and a functional circuit 22 to be driven based on an output voltage of the battery 21. As will be detailed later, the IC 200 is enabled to supply charging power to the battery 21. The IC 200 may be driven based on either the output voltage of the battery 21 or a voltage derived from a voltage source other than the battery 21. Otherwise, a DC voltage obtained by rectifying a signal for NFC communications (detailed later) received from the power supply device 1 may serve as a drive voltage for the IC 200. In this case, the IC 200 remains drivable even when the battery 21 has exhausted to zero remaining capacity.

The electronic device 2 may be an arbitrary electronic device, exemplified by a portable telephone (including portable telephones classified to smartphones), a personal digital assistant, a tablet type personal computer, a digital camera, an MP3 player, a pedometer, or a Bluetooth (registered trademark) headset. The functional circuit 22 implements an arbitrary function to be implemented by the electronic device 2. Accordingly, in a case where the electronic device 2 is a smartphone as an example, the functional circuit 22 includes a conversation processing section arranged to implement conversations with a counterpart device, and a communication processing section arranged to transmit and receive information with other devices via a network, and the like. Otherwise, in another case where the electronic device 2 is a digital camera as an example, the functional circuit 22 includes a drive circuit arranged to drive an imaging device, an image processing circuit arranged to generate image data from an output signal of the imaging device, and the like. The functional circuit 22 may also be regarded as a circuit provided in an external device of the electronic device 2.

Figure 2B:
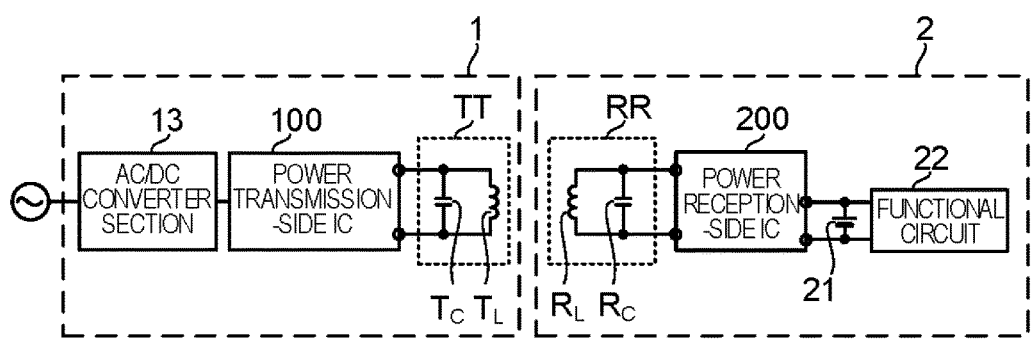

As shown in FIG. 2B, the resonant circuit TT has a coil $T_L$ serving as a power transmission-side coil and a capacitor $T_C$ serving as a power transmission-side capacitor, while the resonant circuit RR has a coil $R_L$ serving as a power reception-side coil and a capacitor $R_C$ serving as a power reception-side capacitor. Hereinbelow, for concrete explanation's sake, unless otherwise specified, it is assumed that the power transmission-side coil $T_L$ and the power transmission-side capacitor $T_C$ are connected in parallel to each other to make up the resonant circuit TT as a parallel resonant circuit, while the power reception-side coil $R_L$ and the power reception-side capacitor $R_C$ are connected in parallel to each other to make up the resonant circuit RR as a parallel resonant circuit. Instead, it is also allowable that the power transmission-side coil $T_L$ and the power transmission-side capacitor $T_C$ are connected in series to each other to make up the resonant circuit TT as a series resonant circuit, while the power reception-side coil $R_L$ and the power reception-side capacitor $R_C$ are connected in series to each other to make up the resonant circuit RR as a series resonant circuit.

With the electronic device 2 placed within a specified range on the power supply base 12 as shown in FIG. 1B, it becomes possible to fulfill communications, power transmission and power reception between the devices 1 and 2 by the magnetic field resonance method (i.e., by using magnetic field resonance).

Communication between the devices 1 and 2 is wireless communication by NFC (Near Field Communication) (hereinafter, this communication will be referred to as NFC communication), where the carrier frequency of the communication is 13.56 MHz (megahertz). Hereinafter, 13.56 MHz will be referred to as reference frequency. Since NFC communications between the devices 1 and 2 are performed by the magnetic field resonance method using the resonant circuits TT and RR, resonance frequencies of both resonant circuits TT and RR are set to the reference frequency. However, as will be described later, the resonance frequency of the resonant circuit RR may temporarily be changed from the reference frequency.

Power transmission and power reception between the devices 1 and 2 are power transmission by NFC from the power supply device 1 to the electronic device 2 as well as power reception by NFC on the electronic device 2. This power transmission and power reception are collectively referred to also as power transfer. Transferring electric power from coil $T_L$ to coil $R_L$ by the magnetic field resonance method allows power transfer to be implemented in non-contact fashion.

For power transfer using magnetic field resonance, an AC current is passed through the power transmission-side coil $T_L$ to generate an alternating magnetic field of the reference frequency in the power transmission-side coil $T_L$. Then, the alternating magnetic field is transferred to the resonant circuit RR that resonates at the reference frequency, causing an AC current to flow through the power reception-side coil $R_L$. That is, electric power is transferred from the resonant circuit TT including the power transmission-side coil $T_L$ to the resonant circuit RR including the power reception-side coil $R_L$. In addition, whereas description may be omitted hereinbelow, a magnetic field generated by the coil $T_L$ or the coil $R_L$ in NFC communications or power transfer is an alternating magnetic field that oscillates at the reference frequency unless otherwise specified.

A state in which the electronic device 2 is placed within a specified range on the power supply base 12 so as to enable the above-described NFC communications and power transfer is referred to as reference placement state (see FIG. 1B). Use of magnetic resonance enables communications and power transfer even with a relatively large distance to the counterpart. However, a considerably distant separation of the electronic device 2 from the power supply base 12 disables NFC communications and power transfer. A state in which the electronic device 2 is separate enough from the power supply base 12 so as to disable the above-described NFC communications and power transfer is referred to as separate state (see FIG. 1A).

Figure 3:
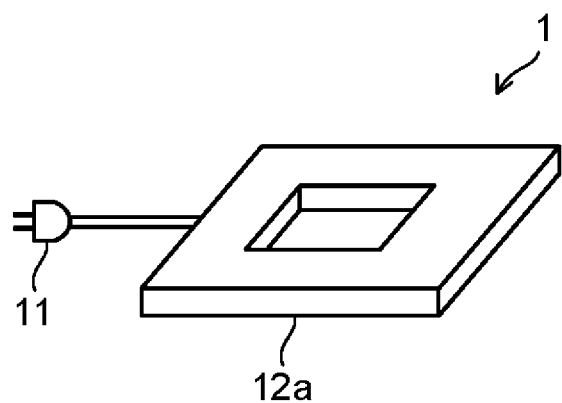
FIG. 3 is a schematic appearance view of a modified power supply device according to the first embodiment of the invention.

Whereas the power supply base 12 shown in FIG. 1A has a flat surface, yet the power supply base 12 may have a recess or the like formed in adaptation to the configuration of the electronic device 2 that is to be placed thereon. That is, for example, the power supply base 12 may be a power supply cradle 12a as shown in FIG. 3.

Figure 4:
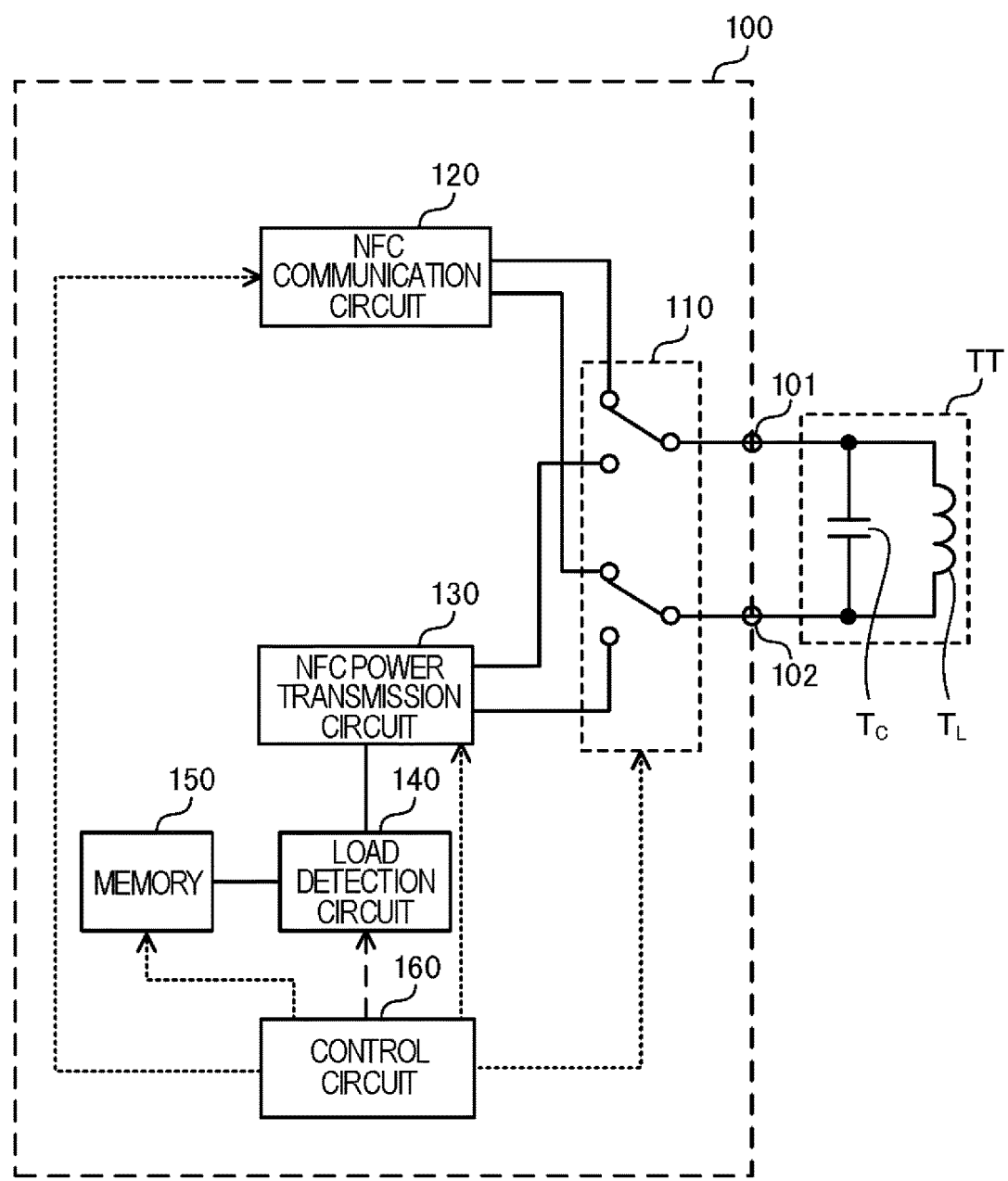
FIG. 4 is a partial configuration diagram of the power supply device according to the first embodiment of the invention, including an internal block diagram of the IC within the power supply device.
Figure 5:
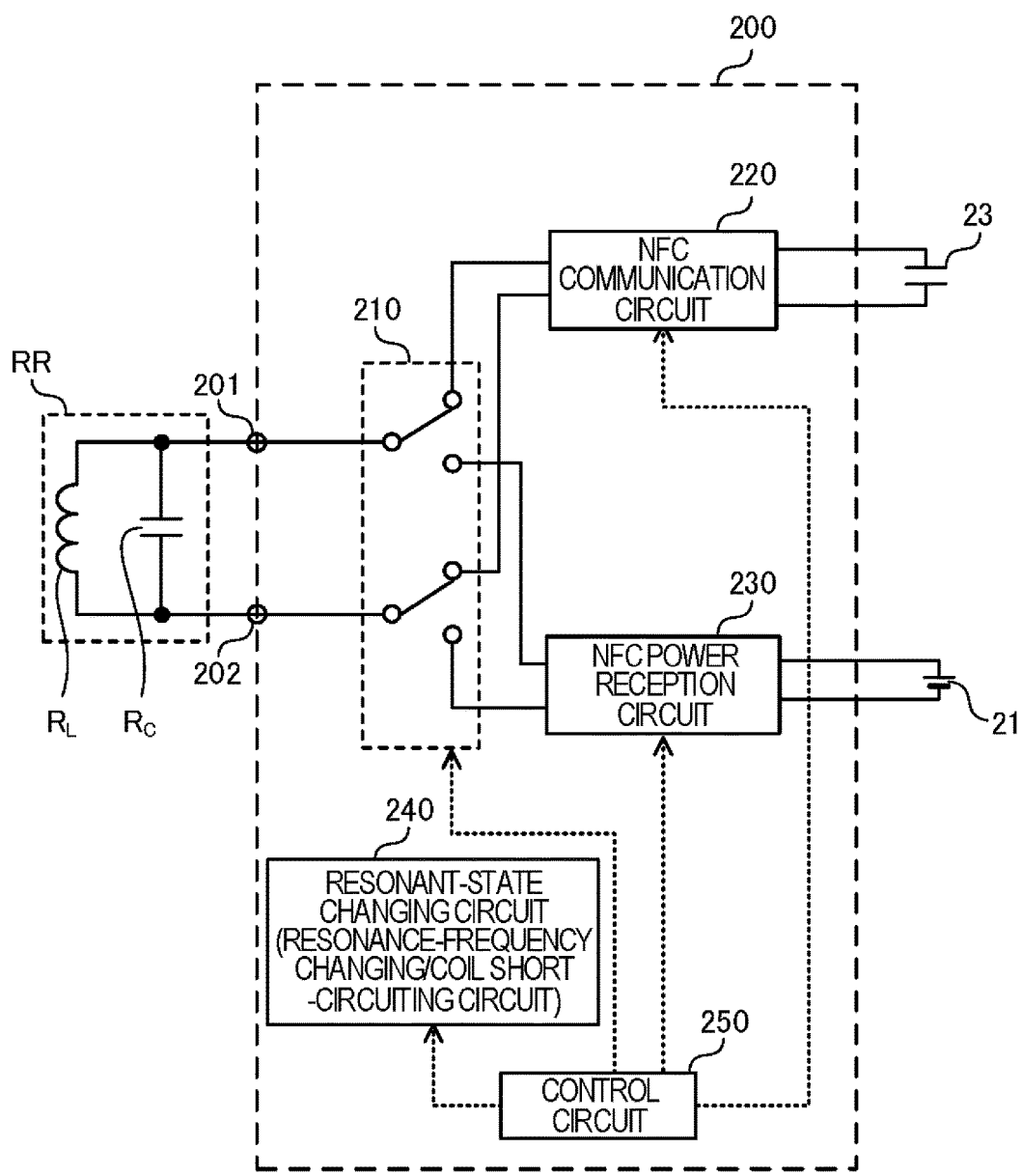
FIG. 5 is a partial configuration diagram of the electronic device according to the first embodiment of the invention, including an internal block diagram of the IC within the electronic device.

FIG. 4 shows a partial configuration diagram of the power supply device 1, including an internal block diagram of the IC 100. Provided in the IC 100 are terminals 101 and 102 as well as individual component members referenced by signs 110, 120, 130, 140, 150 and 160. FIG. 5 shows a partial configuration diagram of the electronic device 2, including an internal block diagram of the IC 200. Provided in the IC 200 are terminals 201 and 202 as well as individual component members referenced by signs 210, 220, 230, 240 and 250. Preferably, a capacitor 23 which outputs a drive voltage of the IC 200 is connected to the IC 200. The capacitor 23 is enabled to output a DC voltage obtained by rectifying a signal for NFC communications received from the power supply device 1.

Each one end of the capacitor $T_C$ and the coil $T_L$ is connected to the terminal 101, while each other end of the capacitor $T_C$ and the coil $T_L$ is connected to the terminal 102. A switching circuit 110 is composed of switches inserted in series between the resonant circuit TT plus the terminals 101, 102 and an NFC communication circuit 120 plus an NFC power transmission circuit 130. The switching circuit 110 makes either one of the circuits 120 and 130 alternatively connected to the terminals 101 and 102, thereby making either one of the circuits 120 and 130 alternatively connected to the resonant circuit TT.

Each one end of the capacitor $R_C$ and the coil $R_L$ is connected to the terminal 201, while each other end of the capacitor $R_C$ and the coil $R_L$ is connected to the terminal 202. A switching circuit 210 is composed of switches inserted in series between the resonant circuit RR plus the terminals 201, 202 and an NFC communication circuit 220 plus an NFC power reception circuit 230. The switching circuit 210 makes either one of the circuits 220 and 230 alternatively connected to the terminals 201 and 202, thereby making either one of the circuits 220 and 230 alternatively connected to the resonant circuit RR.

The state in which the resonant circuit TT and the terminals 101, 102 are connected to the NFC communication circuit 120 via the switching circuit 110 while the resonant circuit RR and the terminals 201, 202 are connected to the NFC communication circuit 220 via the switching circuit 210 is referred to as communication-mode connection state.

While the IC 100 is set to the transmission side in the communication-mode connection state, the NFC communication circuit 120 is enabled to supply an AC signal (AC current) of the reference frequency to the resonant circuit TT via the terminals 101 and 102. Then, superimposing an arbitrary information signal on the AC signal allows the information signal to be transferred to the resonant circuit RR (electronic device 2) by the magnetic resonance method. The information signal transferred from the power supply device 1 is extracted in the NFC communication circuit 220.

While the IC 200 is set to the transmission side in the communication-mode connection state, the NFC communication circuit 220 is enabled to supply an AC signal (AC current) of the reference frequency to the resonant circuit RR via the terminals 201 and 202. Then, superimposing an arbitrary information signal on the AC signal allows the information signal to be transferred to the resonant circuit TT (power supply device 1) by the magnetic resonance method. The information signal transferred from the electronic device 2 is extracted in the NFC communication circuit 120.

The state in which the resonant circuit TT and the terminals 101, 102 are connected to the NFC power transmission circuit 130 via the switching circuit 110 while the resonant circuit RR and the terminals 201, 202 are connected to the NFC power reception circuit 230 via the switching circuit 210 is referred to as power supply-mode connection state.

In the power supply-mode connection state, the NFC power transmission circuit 130 is enabled to perform power transmission operation while the NFC power reception circuit 230 is enabled to perform power reception operation. Power transfer is implemented by the power transmission operation and the power reception operation. In the power transmission operation, the power transmission circuit 130 supplies an AC signal (AC current) of the reference frequency to the resonant circuit TT so as to generate a power transmission-use alternating magnetic field of the reference frequency in the power transmission-side coil $T_L$. Thus, electric power is transmitted by the magnetic field resonance method from the resonant circuit TT (power transmission-side coil $T_L$) to the resonant circuit RR. Based on the power transmission operation, electric power received by the power reception-side coil $R_L$ is transmitted to the power reception circuit 230. In the power reception operation, the power reception circuit 230 generates and outputs an arbitrary DC power from the received power. The battery 21 can be charged with the output power of the power reception circuit 230.

Figure 6:
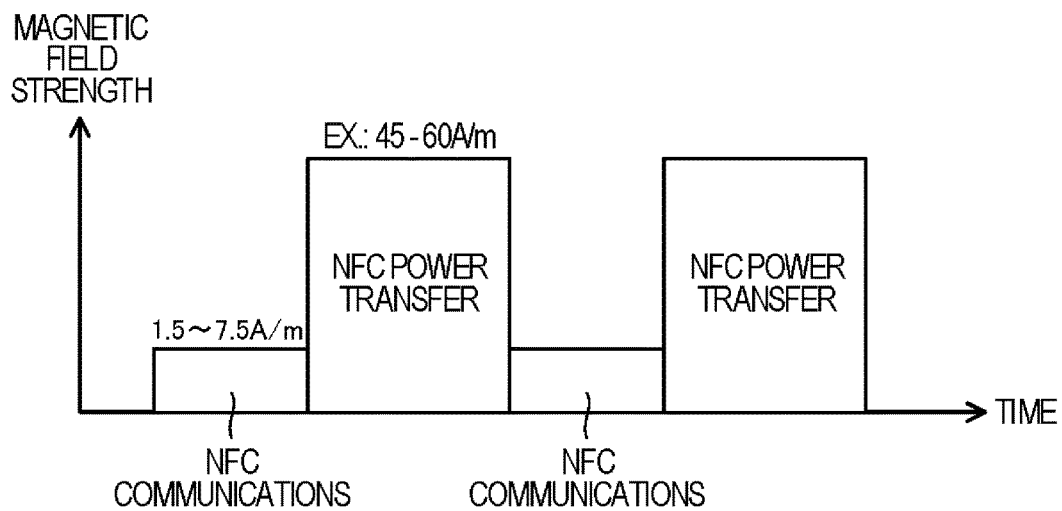
FIG. 6 is a chart showing an aspect of variations in magnetic field strength while NFC communications and power transfer are alternately performed.

Also for execution of NFC communications in the communication-mode connection state, a magnetic field is generated in the coil $T_L$ or the coil $R_L$, where the magnetic field strength involved in NFC communications falls within a specified range. A lower-limit value and an upper-limit value of the range are defined by NFC standards, their values being 1.5 A/m and 7.5 A/m, respectively. In contrast to this, a magnetic field generated in the power transmission-side coil $T_L$ during power transfer (i.e., power transmission operation) has a strength of e.g. about 45 to 60 A/m, which is larger than the foregoing upper-limit value. In a non-contact power supply system including the devices 1 and 2, NFC communications and power transfer (NFC power transfer) can be implemented alternately. An aspect of magnetic field strength resulting in that case is shown in FIG. 6.

Figure 7:
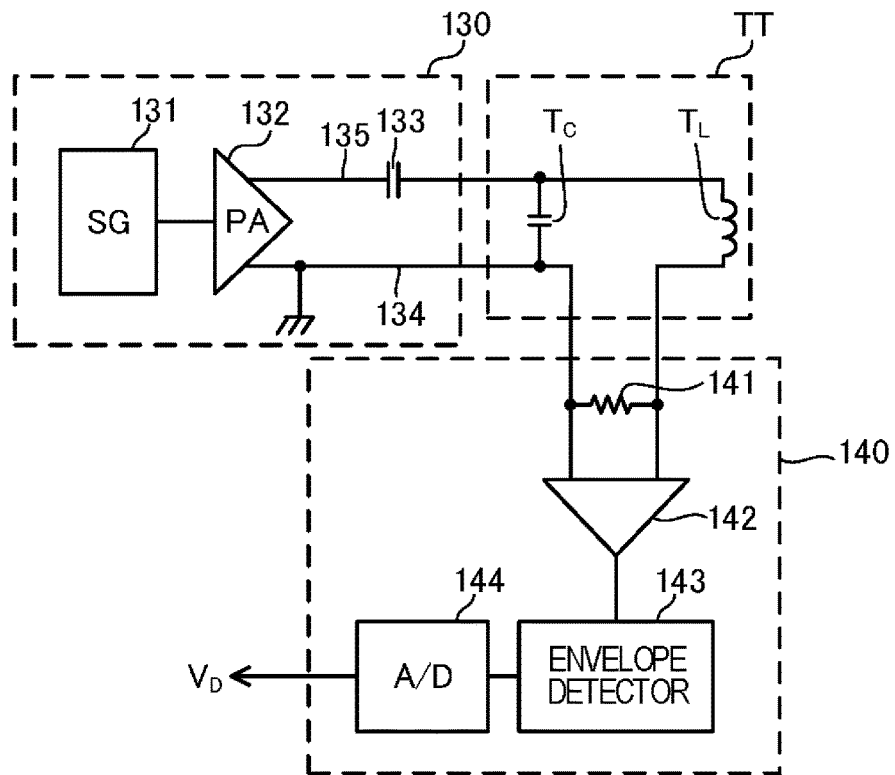
FIG. 7 is a diagram showing a relationship among a power transmission circuit, a load detection circuit, and a resonant circuit within the power supply device.

A load detection circuit 140 detects a magnitude of a load in power transmission, i.e., a magnitude of a load for the power transmission-side coil $T_L$ resulting when an AC signal (AC current) is supplied from the power transmission circuit 130 to the power transmission-side coil $T_L$. FIG. 7 shows a relationship among the power transmission circuit 130, the load detection circuit 140, and the resonant circuit TT in the power supply-mode connection state. In FIG. 7, the switching circuit 110 is omitted in depiction.

The power transmission circuit 130 includes a signal generator 131 arranged to generate a sinusoidal signal of the reference frequency, an amplifier (power amplifier) 132 arranged to amplify the sinusoidal signal generated in the signal generator 131 and output the amplified sinusoidal signal to between lines 134 and 135 by referencing a potential of the line 134, and a capacitor 133. Meanwhile, the load detection circuit 140 includes a sense resistor 141, an amplifier 142, an envelope detector 143, and an A/D converter 144. Signal strength of the sinusoidal signal generated by the signal generator 131 is fixed at a constant value, whereas the amplification factor of the amplifier 132 is variably set by a control circuit 160.

One end of the capacitor 133 is connected to the line 135. In the power supply-mode connection state, the other end of the capacitor 133 is connected in common to each one end of the capacitor $T_C$ and the coil $T_L$ while the other end of the coil $T_L$ is connected in common to the line 134 and the other end of the capacitor $T_C$ via the sense resistor 141.

Figure 8:
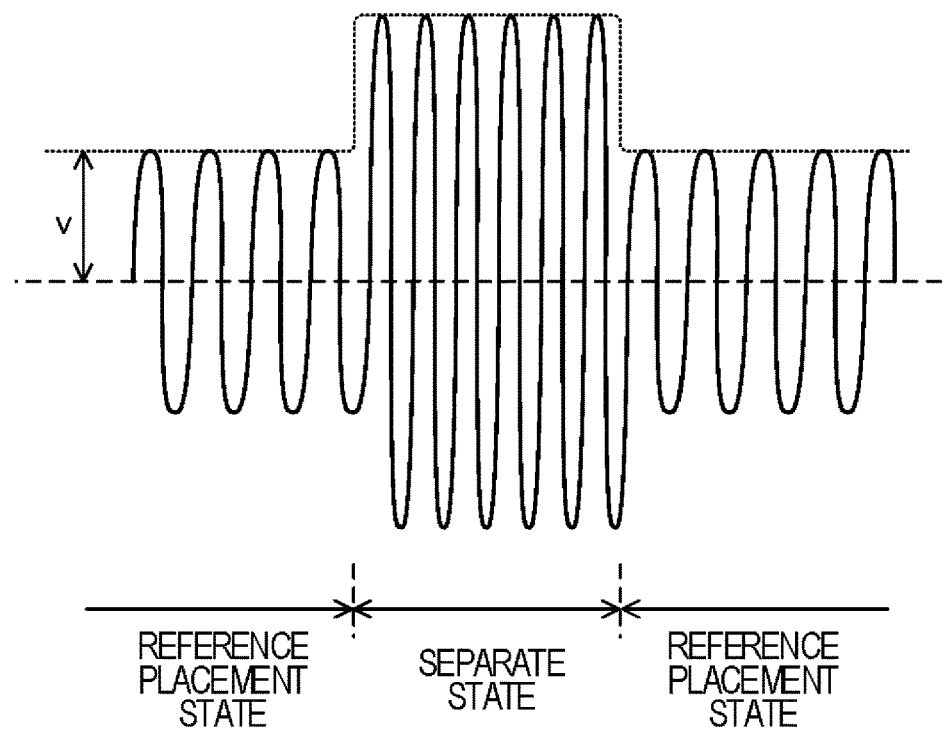
FIG. 8 is a waveform diagram of a voltage drop of a sense resistor in the load detection circuit of FIG. 7.

The power transmission operation is implemented by supplying an AC signal from the amplifier 132 via the capacitor 133 to the resonant circuit TT. In the power supply-mode connection state, when the AC signal derived from the amplifier 132 is supplied to the resonant circuit TT, an AC current of the reference frequency flows through the coil $T_L$, so that an AC voltage drop occurs to the sense resistor 141. A solid-line waveform of FIG. 8 is a voltage waveform of the voltage drop in the sense resistor 141. Under the condition that the strength of the magnetic field generated in the power transmission-side coil $T_L$ remains constant, setting the electronic device 2 nearer to the power supply base 12 causes a current based on the magnetic field generated in the power transmission-side coil $T_L$ to flow through the power reception-side coil $R_L$. Meanwhile, a counter electromotive force based on the current flowing through the power reception-side coil $R_L$ is generated in the power transmission-side coil $T_L$, so that the counter electromotive force acts to reduce the current flowing through the power transmission-side coil $T_L$. As a result of this, as shown in FIG. 8, an amplitude of the voltage drop of the sense resistor 141 in the reference placement state is smaller than that in the separate state.

The amplifier 142 amplifies the signal of the voltage drop in the sense resistor 141. The envelope detector 143 detects an envelope of the signal amplified by the amplifier 142 to output an analog voltage signal proportional to the voltage v of FIG. 8. The A/D converter 144 converts the output voltage signal of the envelope detector 143 to a digital signal to output a digital voltage value $V_D$. As can be understood from the above description, the voltage value $V_D$ has a value proportional to the amplitude of the current flowing through the sense resistor 141 (therefore, amplitude of the current flowing through the power transmission-side coil $T_L$).

For the power transmission-side coil $T_L$ that generates a magnetic field, such a coil as the power reception-side coil $R_L$ to be magnetically coupled with the power transmission-side coil $T_L$ can be regarded as a load. The voltage value $V_D$, which is a detected value of the load detection circuit 140, varies depending on the magnitude of the load. Therefore, it can be considered that the load detection circuit 140 detects the magnitude of a load depending on an output of the voltage value $V_D$. The magnitude of the load in this case (magnitude of the load in power transmission) can be regarded as a magnitude of a load for the power transmission-side coil $T_L$ during power transmission or as a magnitude of a load of the electronic device 2 as viewed from the power supply device 1 during power transmission.

Figure 9:
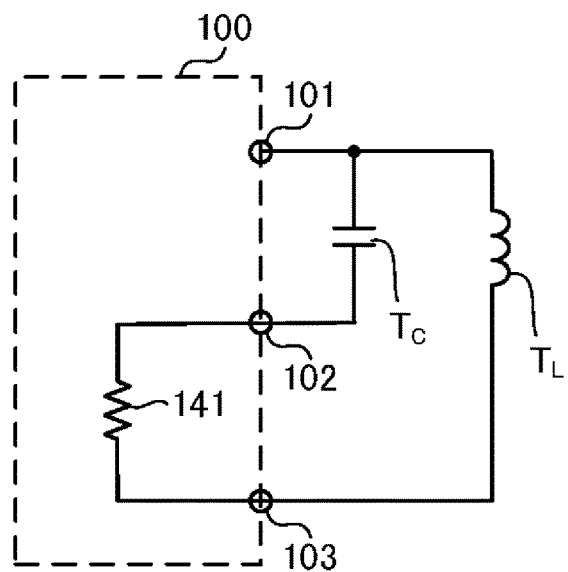
FIG. 9 is a connection circuit diagram among the sense resistor, a power transmission-side coil, and a power transmission-side capacitor.

In addition, when the load detection circuit 140 is configured as shown in FIG. 7, the sense resistor 141 may be provided inside the IC 100 as shown in FIG. 9. In the configuration of FIG. 9, it is appropriate that with a terminal 103 further provided in the IC 100 beforehand, the sense resistor 141 is connected between the terminals 102 and 103 while each one end of the capacitor $T_C$ and the coil $T_L$ is connected in common to the terminal 101 and moreover each other end of the capacitor $T_C$ and the coil $T_L$ is connected to the terminals 102 and 103, respectively. In addition, the sense resistor 141 may also be provided outside the IC 100.

Still more, as it is a known art and so details are omitted, it is also allowable that with the IC 200 set to the transmission side in the communication-mode connection state, the NFC communication circuit 220 does not transmit electric waves by itself, but the load for the resonant circuit TT may be changed so that an arbitrary information signal is transferred to the resonant circuit TT (power supply device 1) by the magnetic resonance method. That is, with the IC 200 set to the transmission side in the communication-mode connection state, the IC 100 makes a non-modulated wave of the reference frequency generated in the resonant circuit TT, in which case the IC 200 changes a weight (e.g., power consumption of the entire IC 200) as a load of the IC 200 as viewed from the resonant circuit TT, in response to an information signal to be transferred to the IC 100. Then, with a second load detection circuit equivalent to the load detection circuit 140 preparatorily provided in the communication circuit 120 within the IC 100, detecting the weight of a load by the second load detection circuit allows the information signal to be extracted in the NFC communication circuit 120.

Reverting to the description of FIG. 4, memory 150 is nonvolatile memory, which stores arbitrary information in nonvolatile fashion. The control circuit 160 integrally controls operations of individual component members within the IC 100. Various aspects of the control exerted by the control circuit 160 include, for example, control of switching operation by the switching circuit 110, control of contents and execution/non-execution as to communication operation and power transmission operation by the communication circuit 120 and the power transmission circuit 130, operational control of the load detection circuit 140, and storage control and read control of the memory 150. The control circuit 160, having a timer (not shown) contained therein, is enabled to measure time length between arbitrary timings.

A resonant-state changing circuit 240 (see FIG. 5) in the electronic device 2 is a resonance-frequency changing circuit arranged to change the resonance frequency of the resonant circuit RR from a reference frequency to another specified frequency $f_M$, or a coil short-circuiting circuit arranged to short-circuit the power reception-side coil $R_L$ in the resonant circuit RR.

A resonance-frequency changing circuit 240A in FIG. 10 is an example of the resonance-frequency changing circuit as the resonant-state changing circuit 240. The resonance-frequency changing circuit 240A is formed of a series circuit of a capacitor 241 and a switch 242. One end of the series circuit is connected in common to each one end of the capacitor $R_C$ and the coil $R_L$, while the other end of the series circuit is connected in common to each other end of the capacitor $R_C$ and the coil $R_L$. The switch 242, which is formed of a semiconductor switching device such as a field-effect transistor, is turned on or off under control of a control circuit 250.

With the switch 242 off, the capacitor 241 is isolated from the capacitor $R_C$ and the coil $R_L$. Therefore, given no consideration to parasitic inductance or parasitic capacitance, the resonant circuit RR is formed of only the coil $R_L$ and the capacitor $R_C$, so that the resonance frequency of the resonant circuit RR becomes equal to the reference frequency. That is, with the switch 242 off, the power reception-side capacitance that determines the resonance frequency of the resonant circuit RR is attributable to the capacitor $R_C$ itself. With the switch 242 on, since the capacitor 241 is connected in parallel with the capacitor $R_C$, the resonant circuit RR is formed of the coil $R_L$ and a combined capacitance of the capacitors $R_C$ and 241, so that the resonance frequency of the resonant circuit RR results in the frequency $f_M$, which is lower than the reference frequency. That is, with the switch 242 on, the power reception-side capacitance that determines the resonance frequency of the resonant circuit RR is equal to the above-mentioned combined capacitance. In this case, it is assumed that the frequency $f_M$ is different from the reference frequency to such an extent that the resonant circuit RR does not function as a load of the power transmission-side coil $T_L$ with the switch 242 on (i.e., to such an extent that not enough magnetic resonance is generated between the resonant circuits TT and RR). For example, the resonance frequency of the resonant circuit RR (i.e., frequency $f_M$) with the switch 242 on is set to 100's kHz to 1 MHz.

As far as the resonance frequency of the resonant circuit RR can be changed to the frequency $f_M$, the resonance-frequency changing circuit as the changing circuit 240 is not limited to the resonance-frequency changing circuit 240A, and the frequency $f_M$ may be higher than the reference frequency. That is, taking into consideration that the power reception-side resonant circuit RR can be a series resonant circuit allows the following to be said. The power reception-side resonant circuit RR includes a parallel circuit or series circuit of the power reception-side coil ($R_L$) and the power reception-side capacitance. Under the condition that the power reception-side capacitance is equal to a specified reference capacitance, a resonance frequency $f_O$ of the power reception-side resonant circuit RR, i.e. a resonance frequency $f_O$ of the parallel circuit or series circuit of the power reception-side coil ($R_L$) and the power reception-side capacitance, is equal to the reference frequency. The resonance-frequency changing circuit makes the power reception-side capacitance increase or decrease from the reference capacitance at necessary timing. As a result, in the power reception-side resonant circuit RR, a parallel circuit or series circuit is made up of the power reception-side coil ($R_L$) and a power reception-side capacitance larger or smaller than the reference capacitance, with the result that the resonance frequency $f_O$ of the power reception-side resonant circuit RR is changed from the reference frequency.

A coil short-circuiting circuit 240B of FIG. 11 is an example of the coil short-circuiting circuit as the resonant-state changing circuit 240. The coil short-circuiting circuit 240B is formed of a switch 243 connected (inserted) between a node to which one end of the capacitor $R_C$ and one end of the coil $R_L$ in the resonant circuit RR are connected in common, and a node to which the other end of the capacitor $R_C$ and the other end of the coil $R_L$ in the resonant circuit RR are connected in common. The switch 243, which is formed of a semiconductor switching device such as a field-effect transistor, is turned on or off under control of the control circuit 250. When the switch 243 is turned on, the coil $R_L$ in the resonant circuit RR is short-circuited (more specifically, both ends of the coil $R_L$ are short-circuited).

Under the condition that the power reception-side coil $R_L$ is short-circuited, the power reception-side resonant circuit RR is no longer present (comes to a state equivalent to one in which the power reception-side resonant circuit RR is absent). Accordingly, while the power reception-side coil $R_L$ remains short-circuited, the load for the power transmission-side coil $T_L$ becomes light enough (i.e., comes to a state as if the electronic device 2 were absent on the power supply base 12). As far as the power reception-side coil $R_L$ can be short-circuited, the coil short-circuiting circuit as the changing circuit 240 is not limited to the coil short-circuiting circuit 240B.

Hereinafter, the operation of changing the resonance frequency $f_O$ of the power reception-side resonant circuit RR from the reference frequency to the specified frequency $f_M$ will be referred to as resonance-frequency changing operation, and the operation of short-circuiting the power reception-side coil $R_L$ by using the coil short-circuiting circuit will be referred to as coil short-circuiting operation. Also, for simplified description's sake, the resonance-frequency changing operation or the coil short-circuiting operation may be expressed as $f_O$ changing/short-circuiting operation.

The control circuit 250 integrally controls individual component members within the IC 200. Various aspects of the control exerted by the control circuit 250 include, for example, control of switching operation by the switching circuit 210, control of contents and execution/non-execution as to communication operation and power reception operation by the communication circuit 220 and the power reception circuit 230, and operational control of the changing circuit 240. The control circuit 250, having a timer (not shown) contained therein, is enabled to measure time length between arbitrary timings.

The control circuit 160 of the power supply device 1 is enabled to decide whether or not any foreign object is present on the power supply base 12, and then to control the power transmission circuit 130 so that power transmission operation is performed only when no foreign object is present. Now definition of the foreign object is explained. FIG. 12A shows a schematic outline diagram of a foreign object 3, and FIG. 12B shows a schematic internal configuration diagram of the foreign object 3. The foreign object 3 includes a resonant circuit JJ formed of a parallel circuit of a coil $J_L$ and a capacitor $J_C$, and a foreign-object internal circuit 300 connected to the resonant circuit JJ. A resonance frequency of the resonant circuit JJ is set to the reference frequency. The foreign object 3 is incompatible with the power supply device 1, unlike the electronic device 2. The foreign object 3 is, for example, an object (card or the like) having a wireless IC tag including an antenna coil (coil $J_L$) of 13.56 MHz irresponsive to NFC communications. Another example of the foreign object 3 is an electronic device having an NFC communication function itself which is, however, invalidated by switch. A smartphone having the NFC communication function, in which the function is turned off by software setting, as an example, can be a foreign object 3. Even a smartphone having the NFC communication function validated, but having no power reception function is classified as a foreign object 3.

With such a foreign object 3 placed on the power supply base 12, in case the power supply device 1 executes power transmission operation, the foreign object 3 may be broken by a ferromagnetic field (e.g., a magnetic field having a magnetic field strength of 12 A/m or more) generated by the power transmission-side coil $T_L$. For example, a ferromagnetic field under power transmission operation may cause a terminal voltage of the coil $J_L$ of the foreign object 3 on the power supply base 12 to increase to 100 V to 200 V such that the foreign object 3, unless formed resistant to such high voltages, may be broken.

(Initial Setting Process)

With a view to enabling the decision as to the presence or absence of a foreign object, a foreign-object detection reference value is preparatorily stored in the memory 150 in initial setting process. The initial setting process is executed by the IC 100 under the following initial setting environment. In the initial setting environment, there is absolutely no load, or a negligibly small load, for the power transmission-side coil $T_L$, and there is no coil to be magnetically coupled with the power transmission-side coil $T_L$. In order to assure this environment, devices containing a coil, which include the electronic device 2 and the foreign object 3, are preparatorily set so as to be sufficiently separate from the power supply base 12. The separate state of FIG. 1A may be considered as satisfying the initial setting environment. In order to assure the obtainment of the initial setting environment, for example, the initial setting process may be executed during manufacture or shipping or the like of the power supply device 1. However, given that the initial setting environment can be ensured, the initial setting process may be executed at any arbitrary timing.

FIG. 13 is an operational flowchart of the initial setting process. For execution of the initial setting process, the control circuit 160 controls the switching circuit 110 so that the power transmission circuit 130 is connected to the resonant circuit TT. Then, magnetic field strength H by the power transmission-side coil $T_L$ is set to a specified test strength at step S11. At subsequent step S12, a voltage value $V_D$ acquired from the A/D converter 144 in the above setting state is obtained as a voltage value $V_{DO}$. At subsequent step S13, a foreign-object detection reference value $V_{REF}$ based on the voltage value $V_{DO}$ is stored in the memory 150.

The magnetic field strength H refers to a generated magnetic field strength of the power transmission-side coil $T_L$, more specifically, a magnetic field strength of an alternating magnetic field generated by the power transmission-side coil $T_L$ and oscillating at the reference frequency. The terms, setting the magnetic field strength H to a test strength, refer to generating an alternating magnetic field, which has a test strength and oscillates at the reference frequency, in the power transmission-side coil $T_L$. For example, it is preferable that $V_{REF}=V_{DO}-\Delta V$ or $V_{REF}=V_{DO}\times k$, where $\Delta V$ is a specified positive infinitesimal value (in addition, it is also allowable that $\Delta V=0$), and k is a factor having a positive specified value less than 1. The control circuit 160 is enabled to variably set the magnetic field strength H by controlling the amplification factor of the amplifier 132 (see FIG. 7). The test strength, being smaller than the generated magnetic field strength (e.g., 45 to 60 A/m) of the power transmission-side coil $T_L$ in power transfer (i.e., power transmission operation), falls within a range from a lower-limit value of 1.5 A/m to an upper-limit value of 7.5 A/m of the communication-use magnetic field strength.

In addition, the voltage value $V_D$, which could be obtained when the magnetic field strength H is set to the specified test strength under the initial setting environment, can be estimated at the design stage. A value derived by this estimation may be stored in the memory 150 as the foreign-object detection reference value $V_{REF}$ without executing the initial setting process. The test strength may be provided in plurality. In this case, repeating the process of the foregoing steps S11 to S13 to a plurality of times allows a plurality of foreign-object detection reference values $V_{REF}$ for a plurality of test strengths to be preparatorily stored in the memory 150.

(Foreign-Object Detection Process (Foreign-Object Detection Process Before Power Transfer))

Here is described foreign-object detection process for detecting the presence or absence of a foreign object 3 on the power supply base 12 (foreign-object detection process before power transfer). First to fourth cases shown in FIG. 14A to FIG. 14D are discussed. In the first case, only the electronic device 2 is present on the power supply base 12. In the second case, the electronic device 2 and the foreign object 3 are present on the power supply base 12. In the third case, only the foreign object 3 is present on the power supply base 12. In the fourth case, neither the electronic device 2 nor the foreign object 3 is present on the power supply base 12.

For execution of the foreign-object detection process, the power transmission circuit 130 is connected to the resonant circuit TT. In the foreign-object detection process, the power transmission circuit 130 makes a test magnetic field (test alternating magnetic field) generated in the power transmission-side coil $T_L$, the test magnetic field having a test strength and oscillating at the reference frequency, while the control circuit 160 acquires a voltage value $V_D$, which results during the generation of the test magnetic field, as a voltage value $V_{DTEST}$ by using the load detection circuit 140. Also, during the period in which the test magnetic field is generated in the power transmission-side coil $T_L$, $f_O$ changing/short-circuiting operation (resonance-frequency changing operation or coil short-circuiting operation) is executed in the electronic device 2.

Accordingly, in the first case, the load for the power transmission-side coil $T_L$ becomes light enough (i.e., comes to a state as if the electronic device 2 were absent on the power supply base 12), causing the voltage value $V_{DTEST}$ to increase such that a discriminative inequality, $V_{DTEST} \geq V_{REF}$, holds.

Meanwhile, in the second case, although the resonance frequency of the resonant circuit RR is changed to the frequency $f_M$ or although the power reception-side coil $R_L$ is short-circuited, yet the foreign object 3 remains present as a load for the power transmission-side coil $T_L$ (the resonance frequency of the resonant circuit JJ of the foreign object 3 still remains the reference frequency), causing the voltage value $V_{DTEST}$ to decrease such that the discriminative inequality, $V_{DTEST} \geq V_{REF}$, does not hold.

In the foreign-object detection process, when the discriminative inequality holds, the control circuit 160 decides that the foreign object 3 is absent on the power supply base 12. This decision is referred to as foreign-object absence decision. On the other hand, in the foreign-object detection process, when the discriminative inequality does not hold, the control circuit 160 decides that the foreign object 3 is present on the power supply base 12. This decision is referred to as foreign-object presence decision. Upon making a foreign-object absence decision, the control circuit 160 permits execution of the power transmission operation by the power transmission circuit 130, whereas upon making a foreign-object presence decision, the control circuit 160 prohibits execution of the power transmission operation by the power transmission circuit 130. The magnetic field strength of the test magnetic field (i.e., test strength) is set considerably smaller than the strength of the magnetic field generated in the power transmission-side coil $T_L$ by the power transmission operation, i.e., set to the upper-limit value (7.5 A/m) or less of the communication-use magnetic field strength, hence no or small fear of breakage or the like of the foreign object 3 due to the test magnetic field.

In the third and fourth cases, since no electronic device 2 responsive to NFC communications is present on the power supply base 12, the power transmission operation is basically unnecessary and therefore the foreign-object detection process itself is not executed. The power supply device 1 is enabled to decide, by NFC communications, whether or not any electronic device 2 compatible with power transfer is present on the power supply base 12.

In addition, the state in which the foreign object 3 is present on the power supply base 12 is not limited to a state in which the foreign object 3 is in direct contact with the power supply base 12. For example, such a state as shown in FIG. 15 in which the electronic device 2 is present on the power supply base 12 in direct contact therewith and moreover in which the foreign object 3 is present on the electronic device 2 is also classified as the state in which a foreign object 3 is present on the power supply base 12, unless the above-described discriminative inequality holds.

In the case where a plurality of foreign-object detection reference values $V_{REF}$ for a plurality of test strengths have been stored in the memory 150, it is also possible that in the foreign-object detection process, a plurality of test magnetic fields having a plurality of test strengths are generated in succession so as to allow the foreign-object absence decision or the foreign-object presence decision to be made based on the holding or not of the discriminative inequality for each test magnetic field.

Figure 16:
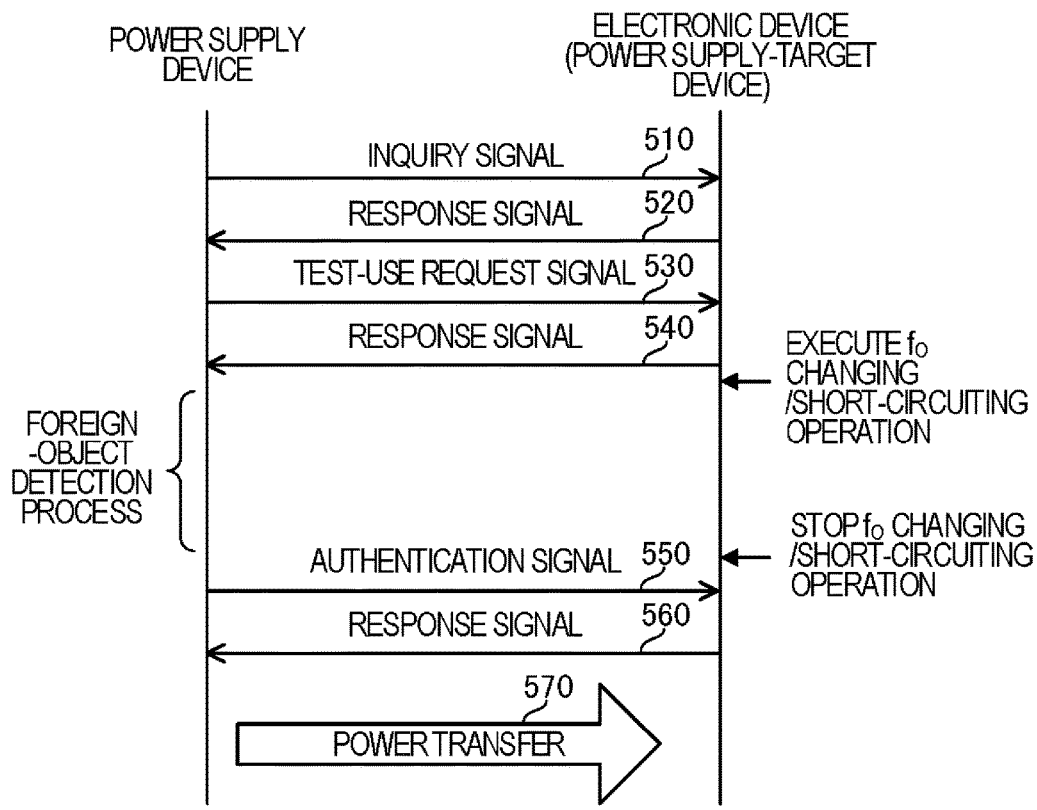
FIG. 16 is a diagram for explaining signal exchanges between the power supply device and the electronic device according to the first embodiment of the invention.

(Signal Exchange up to Power Transfer: FIG. 16)

Signal exchange between the devices 1 and 2 up to execution of power transfer will be explained with reference to FIG. 16. Hereinbelow, unless otherwise specified, it is assumed that the electronic device 2 is present on the power supply base 12 in the reference placement state (FIG. 1B).

NFC communications between the devices 1 and 2 are executed by the half-duplex system. First, with the power supply device 1 set to the transmission side and the electronic device 2 set to the reception side, the power supply device 1 (IC 100) transmits an inquiry signal 510 to a device placed on the power supply base 2 (hereinafter, referred to also as power supply-target device) by NFC communications.

The power supply-target device includes the electronic device 2 and may include a foreign object 3. The inquiry signal 510 includes, for example, a signal for inquiring unique identification information as to the power supply-target device, a signal for inquiring whether or not the power supply-target device is enabled to execute NFC communications, and a signal for inquiring whether or not the power supply-target device is enabled to receive electric power or seeks transmission of electric power.

The electronic device 2 (IC 200), having received the inquiry signal 510, transmits a response signal 520 responsive to an inquiry content of the inquiry signal 510, by NFC communications, to the power supply device 1. The power supply device 1 (IC 100), having received the response signal 520, analyzes the response signal 520, where on condition that the power supply-target device is enabled to perform NFC communications and is ready for reception of electric power or seeking transmission of electric power, the power supply device 1 transmits a test-use request signal 530 to the power supply-target device by NFC communications. The electronic device 2 (IC 200) as the power supply-target device, having received the test-use request signal 530, transmits a response signal 540 responsive to the test-use request signal 530, by NFC communications, to the power supply device 1, and promptly subsequently, executes $f_O$ changing/short-circuiting operation (resonance-frequency changing operation or coil short-circuiting operation). The test-use request signal 530 is, for example, a signal for requesting or instructing or suggesting execution of the $f_O$ changing/short-circuiting operation. The control circuit 250 of the electronic device 2, triggered by reception of the test-use request signal 530, instructs the resonant-state changing circuit 240 to execute the $f_O$ changing/short-circuiting operation. Before the reception of the test-use request signal 530, the $f_O$ changing/short-circuiting operation is set execution-suppressed (does not performed). The test-use request signal 530, only if it can trigger the execution of the $f_O$ changing/short-circuiting operation, may be any arbitrary signal or may be contained in the inquiry signal 510.

The power supply device 1 (IC 100), having received the response signal 540, switches over the connection destination of the resonant circuit TT from the communication circuit 120 to the power transmission circuit 130, and then executes the above-described foreign-object detection process. During the execution period of the foreign-object detection process, the electronic device 2 (IC 200) continues the execution of the $f_O$ changing/short-circuiting operation. More specifically, the electronic device 2 (IC 200), by using the built-in timer, keeps executing the $f_O$ changing/short-circuiting operation for a time duration corresponding to the length of the execution period of the foreign-object detection process before stopping the $f_O$ changing/short-circuiting operation.

In the foreign-object detection process, upon deciding that no foreign object 3 is present on the power supply base 12, the power supply device 1 (IC 100) switches over the connection destination of the resonant circuit TT from the power transmission circuit 130 to the communication circuit 120, and then transmits an authentication signal 550, by NFC communications, to the power supply-target device. The authentication signal 550 includes, for example, a signal for notifying the power supply-target device that power transmission is going to be executed. The electronic device 2 (IC 200), having received the authentication signal 550, transmits a response signal 560 responsive to the authentication signal 550, by NFC communications, to the power supply device 1. The response signal 560 includes, for example, a signal for notifying that contents indicated by the authentication signal 550 have been recognized or a signal for giving permission for contents indicated by the authentication signal 550. The power supply device 1 (IC 100), having received the response signal 560, switches over the connection destination of the resonant circuit TT again from the communication circuit 120 to the power transmission circuit 130, and then executes the power transmission operation, thus power transfer 570 being fulfilled.

In the first case of FIG. 14A, the power transfer 570 is executed along the above-described flow. On the other hand, in the second case of FIG. 14B, the processing proceeds up to the transmission/reception of the response signal 540, but the discriminative inequality does not hold in the foreign-object detection process, resulting in a decision that a foreign object is present on the power supply base 12. Thus, the power transfer 570 is not executed.

Figure 17:
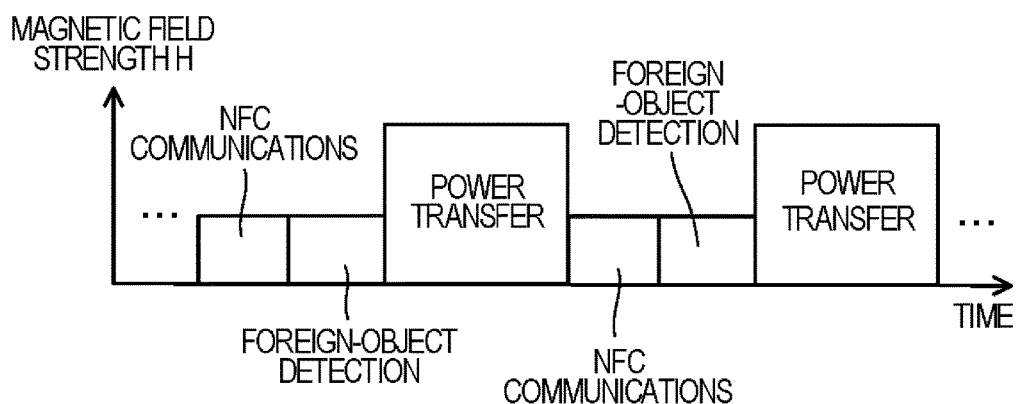
FIG. 17 is a chart showing an aspect in which NFC communications, foreign-object detection process, and power transfer are executed in succession repeatedly according to the first embodiment of the invention.

One-time operation of power transfer 570 may be an operation performed for a specified time period, and sequential steps from transmission of the inquiry signal 510 to the power transfer 570 may be repeatedly executed. Actually, as shown in FIG. 17, NFC communications, foreign-object detection process, and power transfer (NFC power transfer) may be sequentially and repeatedly executed. That is, in the non-contact power supply system, the operation of performing the NFC communications, the operation of performing the foreign-object detection process, and the operation of performing the power transfer can be executed sequentially in time division and moreover repeatedly.

(Operational Flowchart)

Figure 18:
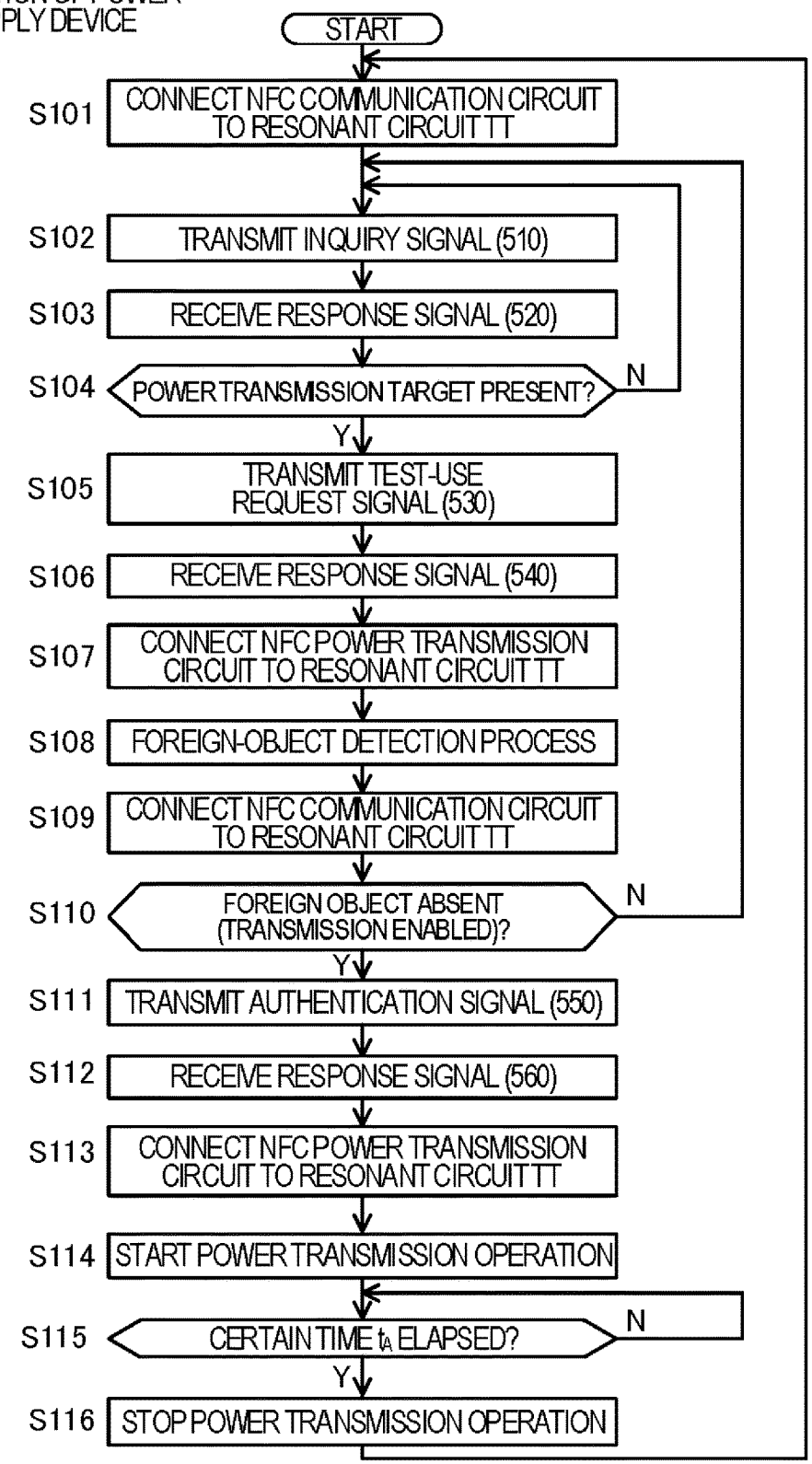
FIG. 18 is an operational flowchart of the power supply device according to the first embodiment of the invention.

Next, the flow of operations by the power supply device 1 will be described. FIG. 18 is an operational flowchart of the power supply device 1. Processing steps starting with step S101 are executed after the initial setting process (similarly applicable also to later-described FIG. 21). Operations of the communication circuit 120 and the power transmission circuit 130 are executed under control by the control circuit 160.

Upon start-up of the power supply device 1, first at step S101, the control circuit 160 makes the communication circuit 120 connected to the resonant circuit TT through control of the switching circuit 110. At subsequent step S102, the control circuit 160 transmits an inquiry signal 510 to the power supply-target device by NFC communications using the communication circuit 120. Thereafter, at step S103, the control circuit 160 stands by for reception of a response signal 520. As the response signal 520 is received by the communication circuit 120, the control circuit 160 analyzes the response signal 520, where on condition that the power supply-target device is enabled to perform NFC communications and is ready for reception of electric power or seeks transmission of electric power, the control circuit 160 decides that a power transmission target is present (Y at step S104), the processing flow moving on to step S105; otherwise (N at step S104), the processing flow returns to step S102.

At step S105, the control circuit 160 transmits a test-use request signal 530 to the power supply-target device by NFC communications using the communication circuit 120. Thereafter, at step S106, the control circuit 160 stands by for reception of a response signal 540. Upon reception of the response signal 540 by the communication circuit 120, at step S107, the control circuit 160 makes the power transmission circuit 130 connected to the resonant circuit TT through control of the switching circuit 110, followed by execution of the above-described foreign-object detection process at subsequent step S108.

After the foreign-object detection process, at step S109, the control circuit 160 makes the communication circuit 120 connected to the resonant circuit TT through control of the switching circuit 110, the processing flow moving on to step S110. When a foreign-object presence decision has been made by the foreign-object detection process of step S108, the processing flow returns from step S110 to step S102; on the other hand, when a foreign-object absence decision has been made, the processing flow goes from step S110 to step S111.

At step S111, the control circuit 160 transmits an authentication signal 550 to the power supply-target device by NFC communications using the communication circuit 120. Thereafter, at step S112, the control circuit 160 stands by for reception of a response signal 560. Upon reception of the response signal 560 by the communication circuit 120, at step S113, the control circuit 160 makes the power transmission circuit 130 connected to the resonant circuit TT through control of the switching circuit 110, where the processing flow goes to step S114. At step S114, the control circuit 160 starts power transmission operation by the power transmission circuit 130, then the processing flow going to step S115.

The control circuit 160, while measuring elapsed time since a start time of the power transmission operation, compares the elapsed time with a specified time $t_A$ at step S115. The comparison process of step S115 is repeated until the elapsed time reaches the time $t_A$, where when the elapsed time has reached the time $t_A$ (Y at step S115), the processing flow goes to step S116. At step S116, the control circuit 160 stops the power transmission operation by the power transmission circuit 130, returning to step S101 to repeat the above-described processes. In addition, also in the first case, when the battery of the electronic device 2 has come to a fully charged state, there will no longer occur movement to step S105 depending on an analysis result of the response signal 520.

Figure 19:
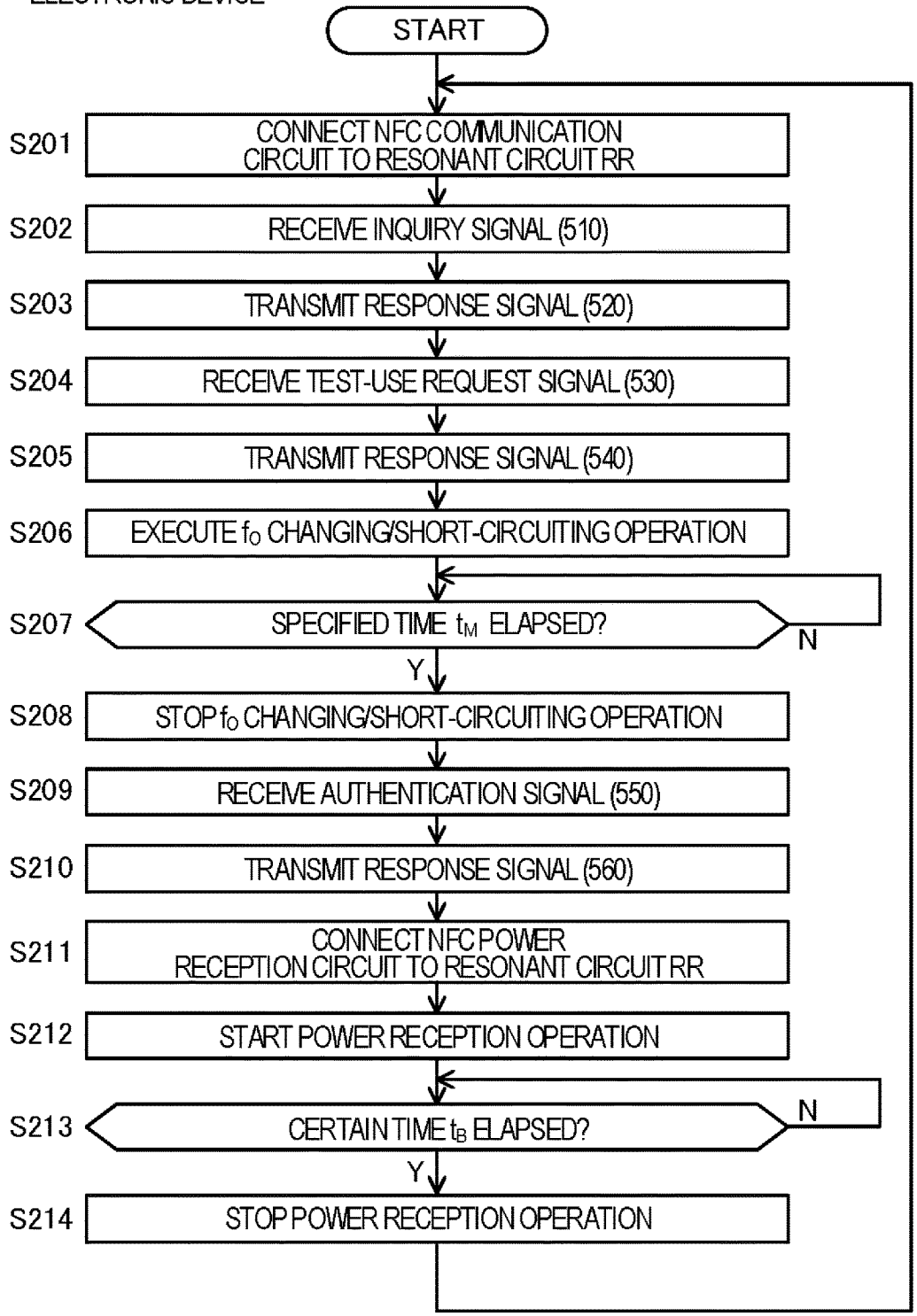
FIG. 19 is an operational flowchart of the electronic device linked with the operations of FIG. 18.

Next, the flow of operations by the electronic device 2 will be described. FIG. 19 is an operational flowchart of the electronic device 2, where processing steps starting with step S201 are executed in linkage with operations of the power supply device 1 that has undergone the initial setting process. Operations of the communication circuit 220 and the power reception circuit 230 are executed under control by the control circuit 250.

Upon start-up of the electronic device 2, first at step S201, the control circuit 250 makes the communication circuit 220 connected to the resonant circuit RR through control of the switching circuit 210. At the start-up time of the electronic device 2, the $f_O$ changing/short-circuiting operation is set execution-suppressed (does not performed). At subsequent step S202, the control circuit 250 stands by for reception of an inquiry signal 510 with use of the communication circuit 220. Upon reception of the inquiry signal 510 by the communication circuit 220, at step S203, the control circuit 250 analyzes the inquiry signal 510 to generate a response signal 520, then transmitting the response signal 520 to the power supply device 1 by NFC communications using the communication circuit 220. In this process, the control circuit 250 checks the state of the battery 21, where when the battery 21 is not in a fully charged state and moreover no abnormality is recognized in the battery 21, a signal for indicating readiness for reception of electric power or seeking transmission of electric power is included in the response signal 520. On the other hand, when the battery 21 is in the fully charged state or any abnormality is recognized in the battery 21, a signal indicating unreadiness for reception of electric power is included in the response signal 520.

When the test-use request signal 530 is received by the communication circuit 220 at subsequent step S204, the processing flow goes to step S205. At step S205, the control circuit 250 transmits a response signal 540 to the power supply device 1 by NFC communications using the communication circuit 220, and at subsequent step S206, executes the $f_O$ changing/short-circuiting operation by using the resonant-state changing circuit 240, i.e., changes the resonance frequency $f_O$ from the reference frequency to the frequency $f_M$ or short-circuits the power reception-side coil $R_L$. The control circuit 250 measures elapsed time since a start of execution of the $f_O$ changing/short-circuiting operation (step S207), where when the elapsed time has reached a specified time $t_M$, the control circuit 250 stops the $f_O$ changing/short-circuiting operation (step S208), i.e., returns the resonance frequency $f_O$ to the reference frequency or cancels the short-circuiting of the power reception-side coil $R_L$. Thereafter, the processing flow goes to step S209. The time $t_M$ is preparatorily so set that during a period in which the test magnetic field is generated in the power supply device 1, the execution of the $f_O$ changing/short-circuiting operation is maintained and upon an end of the period, the $f_O$ changing/short-circuiting operation is promptly stopped. The time $t_M$ may also be specified in the test-use request signal 530.

At step S209, the control circuit 250 stands by for reception of an authentication signal 550 with use of the communication circuit 220. Upon reception of the authentication signal 550 by the communication circuit 220, at step S210, the control circuit 250 transmits a response signal 560 responsive to the authentication signal 550, by NFC communications using the communication circuit 220, to the power supply device 1. In addition, when the foreign object 3 is present on the power supply base 12, the authentication signal 550 is not transmitted from the power supply device 1 (see step S110 of FIG. 18). Therefore, it is appropriate that when the authentication signal 550 is not received during a certain time period at step S209, the processing flow returns to step S201.

After the transmission of the response signal 560, at step S211, the control circuit 250 makes the power reception circuit 230 connected to the resonant circuit RR through control of the switching circuit 210. At subsequent step S212, the control circuit 250 starts up power reception operation using the power reception circuit 230. The control circuit 250 measures elapsed time since a start time of the power reception operation, and compares the elapsed time with a specified time $t_B$ (step S213). Then, when the elapsed time has reached the time $t_B$ (Y at step S213), the control circuit 250 at step S214 stops the power reception operation, returning to step S201.

The time $t_B$ is preparatorily set or specified in the authentication signal 550 so that the period during which the power reception operation is executed becomes substantially equal to a period during which the power transmission operation is executed by the power supply device 1. It is also allowable that after the start of the power reception operation, the control circuit 250 monitors a charging current to the battery 21, where when the charging current value has become a specified value or less, it is decided that the power transmission operation has been ended, followed by executing stop of the power reception operation as well as movement to step S201.

According to this embodiment, when the foreign object 3 is erroneously placed on the power supply base 12, the power transmission operation is set execution-suppressed through the foreign-object detection process. Thus, breakage of the foreign object 3 or the like due to execution of the power transmission operation can be avoided.

<<Second Embodiment>>

A second embodiment of the invention will be described. The second embodiment and later-described third to sixth embodiments are embodiments based on the first embodiment. Therefore, as to constituent parts and components that are not particularly described in the second to sixth embodiments, descriptions of the first embodiment apply to the second to sixth embodiments unless contradictions exist therebetween. Among the first to sixth embodiments, any arbitrary plurality of embodiments may be combined together unless contradictions exist therebetween.

By the techniques described in the first embodiment, the presence or absence of any foreign object 3 can be detected before power transfer. However, during the power transfer, the foreign object 3 may be placed on the power supply base 12 in addition to the electronic device 2. Also, after the start of the power transfer, the electronic device 2 may be taken away from on the power supply base 12. Otherwise, as is rarely the case, such an abnormality can occur to the electronic device 2 that the magnitude of the load for the power transmission-side coil $T_L$, is largely changed during the power transfer. In these cases, power transmission operation that is under execution should be stopped or is preferably stopped in terms of protection of the foreign object 3, suppression of wasteful power consumption, and protection of the electronic device 2.

Figure 20:
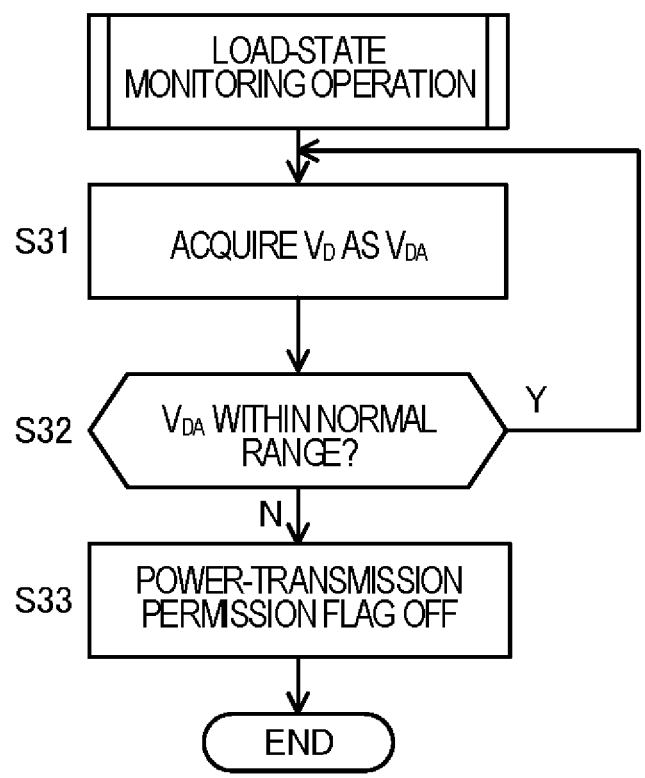
FIG. 20 is a flowchart of load-state monitoring operation to be executed in a power supply device according to a second embodiment of the invention.

Accordingly, the control circuit 160 of the power supply device 1 continues executing load-state monitoring operation during the execution of the power transmission operation. FIG. 20 is a flowchart of the load-state monitoring operation. In the load-state monitoring operation, the control circuit 160, first at step S31, acquires a latest voltage value $V_D$ as a voltage value $V_{DA}$ from the load detection circuit 140. At subsequent step S32, it is decided whether or not the voltage value $V_{DA}$ falls within a specified normal range. When the voltage value $V_{DA}$ falls within the normal range, the processing flow returns to step S31, where processes of steps S31 and S32 are repeated; otherwise, i.e., when the voltage value $V_{DA}$ deviates from the normal range, a power-transmission permission flag is set to OFF at step S33. The power-transmission permission flag, which is managed by the control circuit 160, is set to either ON or OFF. With the power-transmission permission flag set to ON, the control circuit 160 permits execution of the power transmission operation; conversely, with the power-transmission permission flag set to OFF, the control circuit 160 prohibits the execution of the power transmission operation or stops the power transmission operation.

The above-mentioned normal range is a range which is not less than a specified lower-limit value $V_{VTHL}$ and which is not more than a specified upper-limit value $V_{THH}$ ($0<V_{THL}<V_{THH}$). It is appropriate that the lower-limit value $V_{THL}$ and the upper-limit value $V_{THH}$ that have previously been properly determined through experiments or the like are stored in the memory 150. For example, in a case where the foreign object 3 is placed on the power supply base 12 in addition to the electronic device 2 during power transfer, on condition that the load for the power transmission-side coil $T_L$ is excessively heavy so as to cause the voltage value $V_D$ to decrease to a first voltage value, a value slightly larger than the first voltage value may appropriately be set as the lower-limit value $V_{THL}$. In another case where neither the electronic device 2 nor the foreign object 3 is present on the power supply base 12 during power transfer, on condition that the load for the power transmission-side coil $T_L$ is excessively light so as to cause the voltage value $V_D$ to increase to a second voltage value, a value slightly smaller than the second voltage value may appropriately be set as the upper-limit value $V_{THH}$.

Figure 21:
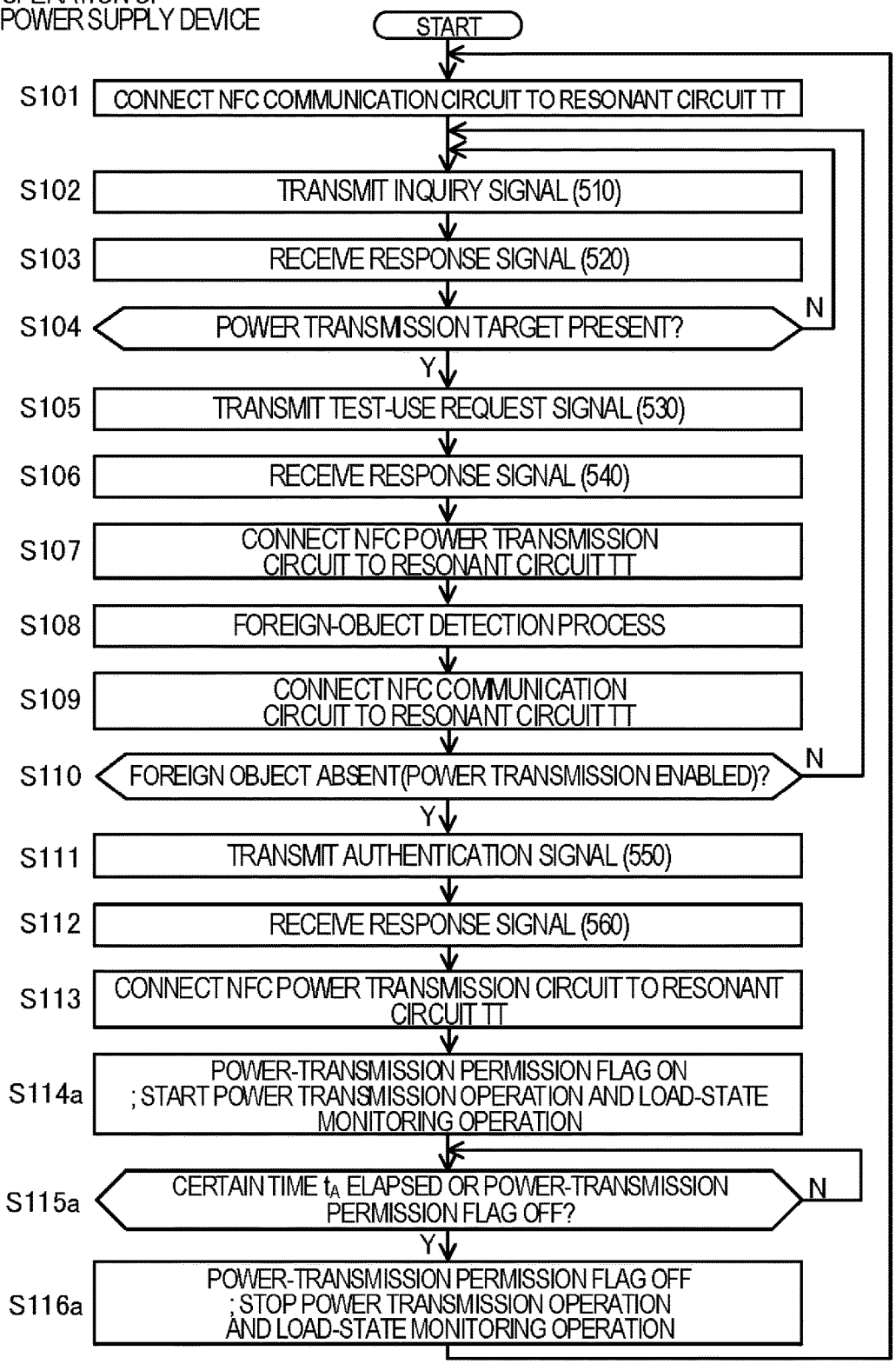
FIG. 21 is an operational flowchart of the power supply device according to the second embodiment of the invention.

FIG. 21 is an operational flowchart of the power supply device 1 according to the second embodiment. On a basis of the operational flowchart of the power supply device 1 described in the first embodiment (FIG. 18), steps S114, S115 and S116 are replaced with steps S114a, S115a and S116a, respectively, in the second embodiment. Except for this replacement, the operational flowchart of the power supply device 1 is common between the first and second embodiments. Description of those common parts is omitted.

At step S114a, the control circuit 160 sets the power-transmission permission flag to ON and moreover starts up both power transmission operation using the power transmission circuit 130 and load-state monitoring operation using the load detection circuit 140. Thereafter, the processing flow goes to step S115a. The control circuit 160 measures elapsed time since a start time of the power transmission operation and, at step S115a, compares the elapsed time with a specified time $t_A$ (e.g., 10 min.) and moreover checks the status of the power-transmission permission flag. Then, when the elapsed time has reached the specified time $t_A$ or when the power-transmission permission flag is set to OFF by the load-state monitoring operation, the processing flow goes to step S116a. At step S116a, the control circuit 160 switches the power-transmission permission flag from ON to OFF or maintains the power-transmission permission flag at OFF, and moreover stops the power transmission operation and the load-state monitoring operation, thereafter returning to step S101.

As described above, the load-state monitoring operation indeed functions beneficially, but has some anxious matters as follows (however, the following description of anxious matters is based on the assumption that a later-described power stabilization circuit 270 (see FIG. 22 or the like) is not provided in the electronic device 2).

As to a first anxiety, for example, assuming that the battery 21 is charged with electric power received by the power transfer, charging current decreases as the battery 21 nears the full charge. With the presence of the functional circuit 22 (see FIG. 2A or the like) disregard, a decrease in charging current corresponds to a decrease in power consumption of the load circuit including the battery 21. A decrease in power consumption of the load circuit means a decrease in output power of the power reception circuit 230 for the load circuit. Since the output power of the power reception circuit 230 for the load circuit corresponds to the electric power received by the electronic device 2 in power transfer, a decrease in output power (received power) of the power reception circuit 230 due to a decrease in charging current causes the load for the power transmission-side coil $R_L$ to lessen in magnitude, so that, in some cases, the voltage value $V_{DA}$ in the load-state monitoring operation can surpass the upper-limit value $V_{THH}$ so that the power-transmission permission flag is set to OFF.

As to a second anxiety, for example, assuming that the load circuit of the electronic device 2 includes the battery 21 and the functional circuit 22, power consumption of the load circuit increases or decreases depending on the operating state of the functional circuit 22. This increase or decrease, in turn, causes the load for the power transmission-side coil $R_L$ to increase or decrease in magnitude. As a result, depending on the cases, the voltage value $V_{DA}$ in the load-state monitoring operation deviates from the normal range such that the power-transmission permission flag can be set to OFF.

Accordingly, as shown in FIG. 22, in the second embodiment, a power stabilization circuit 270 is interposed between the power reception circuit (NFC power reception circuit) 230 and a load circuit 280 (this may be similarly applicable also to later-described other embodiments). The power reception circuit 230, the power stabilization circuit 270, and the load circuit 280 are mounted within the electronic device 2.

The power reception circuit 230 includes a rectifying/smoothing circuit arranged to rectify and smooth AC power received by the power reception-side coil $R_L$ in power transfer to generate DC power. The power reception circuit 230 supplies the resulting DC power to the power stabilization circuit 270 as output power of the power reception circuit 230. An output voltage from the power reception circuit 230 to the power stabilization circuit 270 is expressed by a symbol of $V_A$.

The output voltage of the power reception circuit 230 is supplied to the load circuit 280 through the power stabilization circuit 270. The power stabilization circuit 270 operates so as to suppress variations in the output power of the power reception circuit 230 due to variations in the power consumption of the load circuit 280. Ideally, for example, the power stabilization circuit 270 operates so that the output power of the power reception circuit 230 is maintained constant even though power consumption of the load circuit 280 varies.

The load circuit 280 performs an arbitrary electrical operation by consuming electric power supplied from the power reception circuit 230 through the power stabilization circuit 270. The load circuit 280, as shown in FIG. 23A, includes a battery 21 and a charging circuit BC for charging the battery 21, or otherwise includes, as shown in FIG. 23B, a battery 21, a charging current BC and a functional circuit 22. The charging circuit BC performs specified power conversion process on electric power supplied from the power reception circuit 230 through the power stabilization circuit 270 (i.e., on output power of the power stabilization circuit 270) to generate charging power. The charging circuit BC supplies the resulting charging power to the battery 21, thereby charging the battery 21. The power stabilization circuit 270 may be mounted on the IC 200 (see FIG. 5). In addition to the power stabilization circuit 270, the charging circuit BC may also be mounted on the IC 200.

Figure 24:
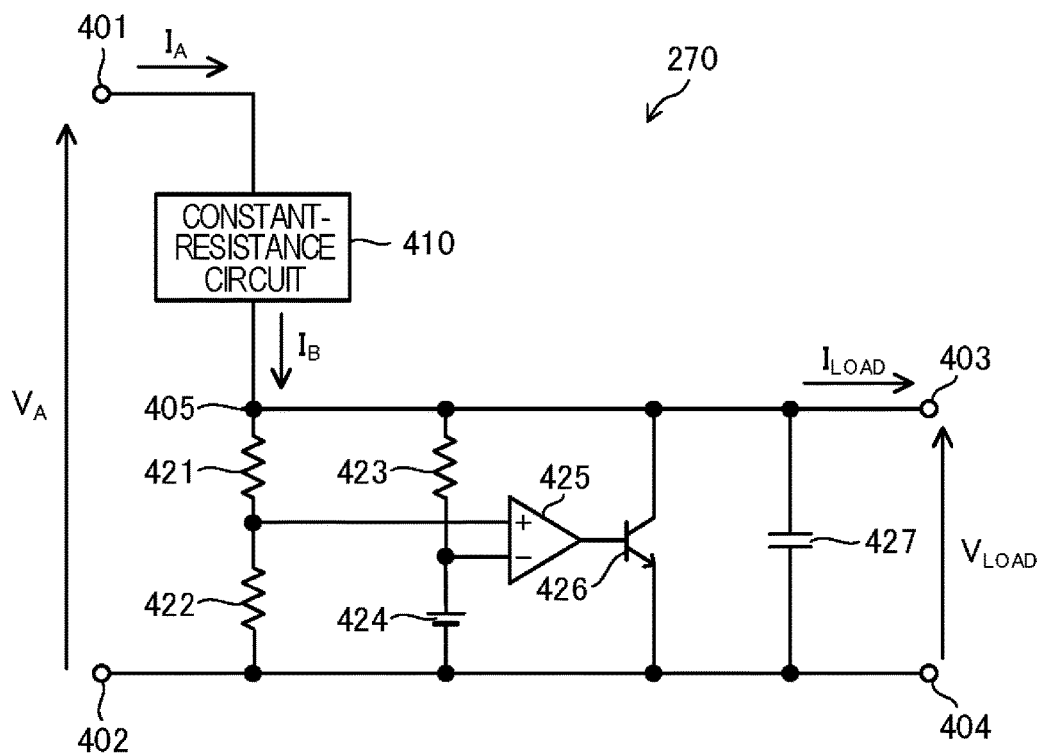
FIG. 24 is a circuit diagram showing a configuration example of the power stabilization circuit of FIG. 22.

FIG. 24 shows an example of the circuit diagram of the power stabilization circuit 270. The power stabilization circuit 270 of FIG. 24 includes component members referenced by signs 401 to 405, 410, and 421 to 427. The output voltage $V_A$ of the power reception circuit 230 is applied to between terminals 401 and 402, with the terminal 402 on the lower potential side. A constant-resistance circuit 410 is provided between the terminal 401 and a node 405. A current flowing via the terminals 401 and 402 based on the voltage $V_A$ is expressed by sign $I_A$. A voltage $V_{LOAD}$ between terminals 403 and 404, with the terminal 404 on the lower potential side, is applied as an output voltage of the power stabilization circuit 270 to the load circuit 280 (specifically, charging circuit BC), so that a supply current $I_{LOAD}$ for the load circuit 280 flows via the terminals 403 and 404. The terminals 402 and 404 are connected to each other.

The node 405 is connected to one end of a resistor 421. The other end of the resistor 421 is connected to a noninverting input terminal of an amplifier 425 and moreover connected via a resistor 422 to the terminals 402 and 404. A constant-voltage source 424 supplies a constant DC voltage based on a potential of the terminal 402 to the inverting input terminal of the amplifier 425. The inverting input terminal of the amplifier 425 is connected via a resistor 423 to the node 405. An output terminal of the amplifier 425 is connected to a base of a transistor 426 formed as an npn bipolar transistor. In the transistor 426, the collector is connected to the node 405 and the emitter is connected to the terminals 402 and 404. Also, a capacitor 427 is connected to between the terminals 403 and 404. The terminal 403 is connected to the node 405.

Figure 25:
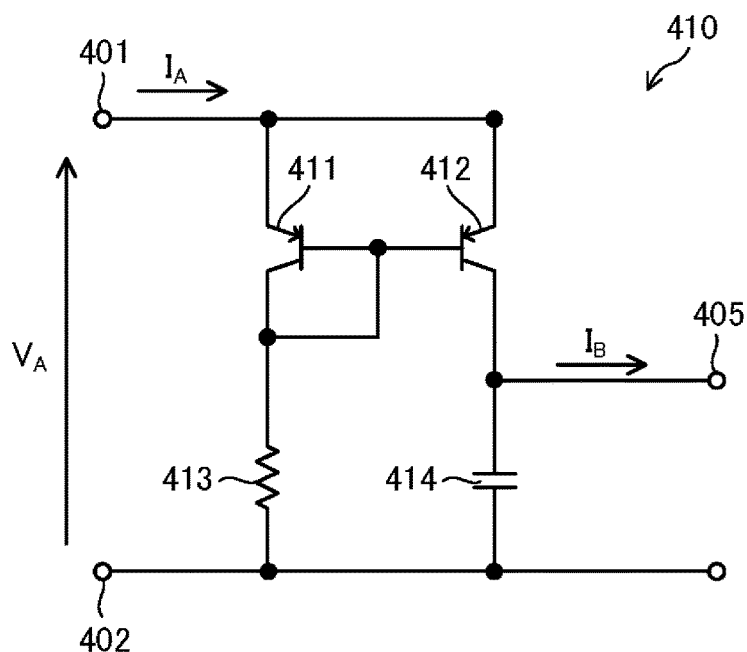
FIG. 25 is a circuit diagram showing a configuration example of a constant-resistance circuit of FIG. 24.

FIG. 25 shows an example of the circuit diagram of the constant-resistance circuit 410. The constant-resistance circuit 410 of FIG. 25 include transistors 411 and 412 formed as pnp bipolar transistors, a resistor 413, and a capacitor 414. Emitters of the transistors 411 and 412 are connected in common to the terminal 401. Bases of the transistors 411 and 412 are connected in common to the collector of the transistor 411. The collector of the transistor 411 is connected via the resistor 413 to the terminal 402. The collector of the transistor 412 is connected to the above-mentioned node 405 and moreover connected via the capacitor 414 to the terminal 402.

Since the voltage $V_A$ is large (e.g., a few to tens of volts) enough to allow a current to flow through the transistor 411 and since the transistors 411 and 412 form a current mirror circuit, a current $I_B$ proportional to the collector current of the transistor 411 flows through the collector of the transistor 412. Then, on condition that temperature variations or the like are disregarded, the resistance value of the resistor 413 is fixed and therefore, given that the voltage $V_A$ is determined, the value of the current $I_B$ flowing from the constant-resistance circuit 410 toward the node 405 becomes constant (however, variations in base-emitter voltages of the transistors 411 and 412 are disregarded). That is, the constant-resistance circuit 410 fulfills an operation like a constant resistor that outputs a current $I_B$ generally proportional to the voltage $V_A$ upon receiving an input of the voltage $V_A$ for the power stabilization circuit 270. However, a value, $V_A/I_B$, indicative of a resistance value of the constant resistor actually varies to some extent depending on the voltage $V_A$.

Power consumption $W_{LOAD}$ of the load circuit 280 is expressed as $W_{LOAD}=V_{LOAD} \times I_{LOAD}$. For example, assuming that the battery 21 is charged with electric power received by the power transfer, as the battery 21 nears the full charge, the charging current decreases, so that the power consumption $W_{LOAD}$ decreases. The resulting decrement is consumed as heat in the transistor 426 by the function of the amplifier 425.

As described above, the power stabilization circuit 270 operates in such a fashion that even when the power consumption $W_{LOAD}$ of the load circuit 280 has varied, the output voltage ($V_A \times I_A$) of the power reception circuit 230 never or seldom varies. Thus, there can be suppressed an occurrence, for example, that the power transmission operation, which basically should not be stopped, is stopped in response to power consumption changes of the load circuit 280.

In addition, it is assumed that the above-described normal range is so set that the voltage value $V_D$ observed when only the electronic device 2 out of the $f_O$ changing/short-circuiting operation is present on the power supply base 12 falls within the normal range.

<<Third Embodiment>>

A third embodiment of the invention will be described. It is noted that the third embodiment and the foregoing second embodiment may be combined together, or the third embodiment may be carried out without being combined with the second embodiment. As to the above-described foreign-object detection process and the load-state monitoring operation, in the case where power transmission control is exerted in response to transient, short-time fluctuations in current amplitude of the power transmission-side coil $T_L$, power-transmission prohibition control may be executed also due to slight vibrations of the electronic device 2 on the power supply base 12, noise or the like. Further, given that no power stabilization circuit 270 of the second embodiment is mounted on the electronic device 2, power-transmission prohibition control can be executed in response to high-frequency components of variations in power consumption of the load circuit 280. With a view to avoiding this, it is appropriate to perform power transmission control by using amplitude information obtained by subjecting an output signal of the envelope detector 143 to high-range reduction process (i.e., averaging process or low-pass filtering). As implemental methods for this, first and second high-range reduction methods are exemplarily described below.

Figure 26:
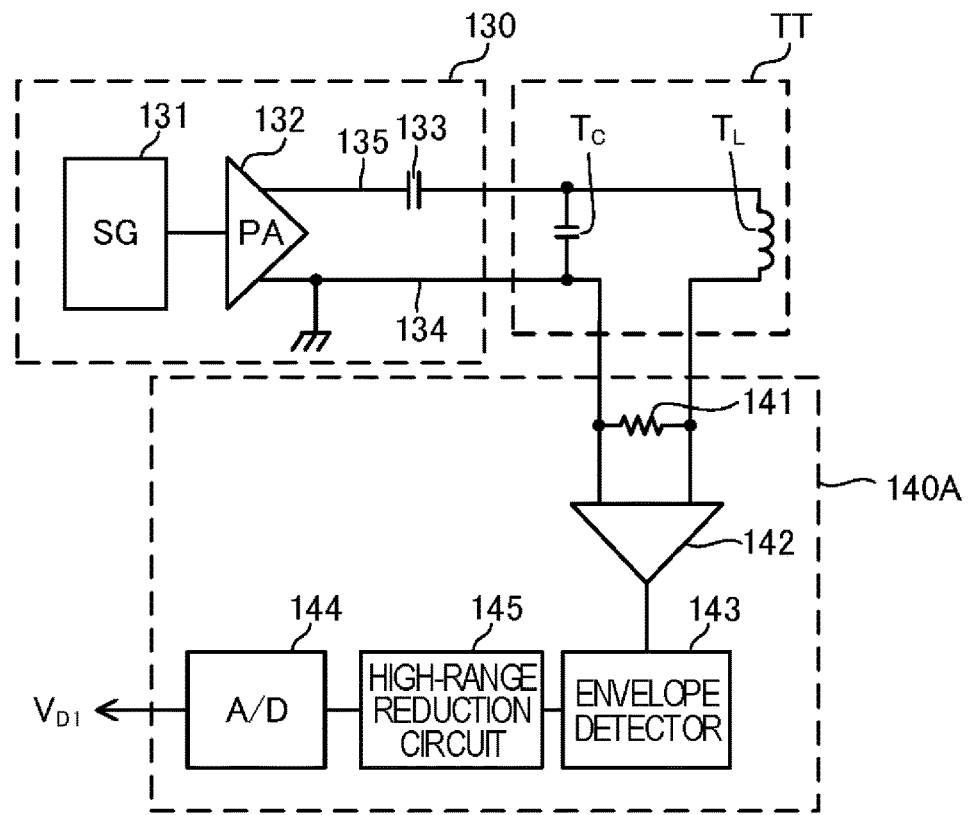
FIG. 26 is a partial block diagram of a power supply device arranged to implement a first high-range reduction method according to a third embodiment of the invention.

With reference to FIG. 26, the first high-range reduction method is described. In the first high-range reduction method, a load detection circuit 140A is employed as the load detection circuit 140. In the load detection circuit 140A, a high-range reduction circuit 145 is added to the load detection circuit 140 described in the first embodiment. The high-range reduction circuit 145, which could be called low-pass circuit, is interposed between the envelope detector 143 and the A/D converter 144.

In the load detection circuit 140A, the amplifier 142 amplifies a signal of voltage drop in the sense resistor 141, and the envelope detector 143 detects an envelope of the signal amplified by the amplifier 142 to output an analog voltage signal proportional to the voltage v of FIG. 8. The high-range reduction circuit 145 subjects the output signal of the envelope detector 143 to the high-range reduction process, and outputs a high-range reduction-processed signal to the A/D converter 144. The high-range reduction process in this case is a process in which signal components of relatively low frequencies in the output signal of the envelope detector 143 are passed while its signal components of relatively high frequencies are reduced (attenuated). The A/D converter 144 converts an output voltage signal of the high-range reduction circuit 145 to a digital signal to output a digital voltage value $V_{D1}$. The voltage value $V_{D1}$ is information (detection result information) obtained by subjecting the amplitude value of a current flowing through the power transmission-side coil $T_L$ to the high-range reduction process. With use of the load detection circuit 140A according to the first high-range reduction method, the voltage value $V_{D1}$ is used as the voltage value $V_D$ in various processes and operations including the foreign-object detection process and the load-state monitoring operation.

Figure 27:
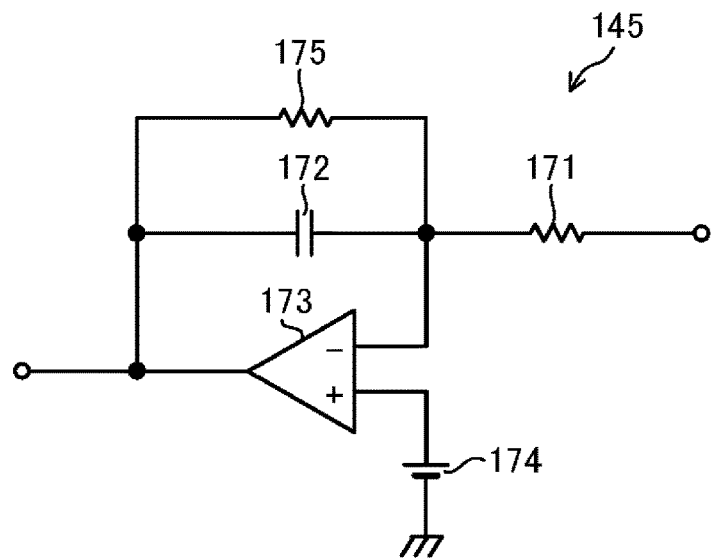
FIG. 27 is a circuit diagram showing a configuration example of the high-range reduction circuit of FIG. 26.

FIG. 27 shows an example of the circuit diagram of the high-range reduction circuit 145. The high-range reduction circuit 145 of FIG. 27 includes component members referenced by signs 171 to 175. An output signal of the envelope detector 143 is applied to one end of a resistor 171, while the other end of the resistor 171 is connected to the inverting input terminal of an amplifier 173 and moreover connected to an output terminal of the amplifier 173 via a parallel circuit of a capacitor 172 and a resistor 175. A constant DC voltage generated by a reference voltage source 174 is applied to the noninverting input terminal of the amplifier 173. A signal resulting from subjecting the output signal of the envelope detector 143 to the high-range reduction process is outputted from the output terminal of the amplifier 173. Thus, the output signal of the amplifier 173 is inputted to the A/D converter 144 of FIG. 26 as an output voltage signal of the high-range reduction circuit 145.

Figure 28:
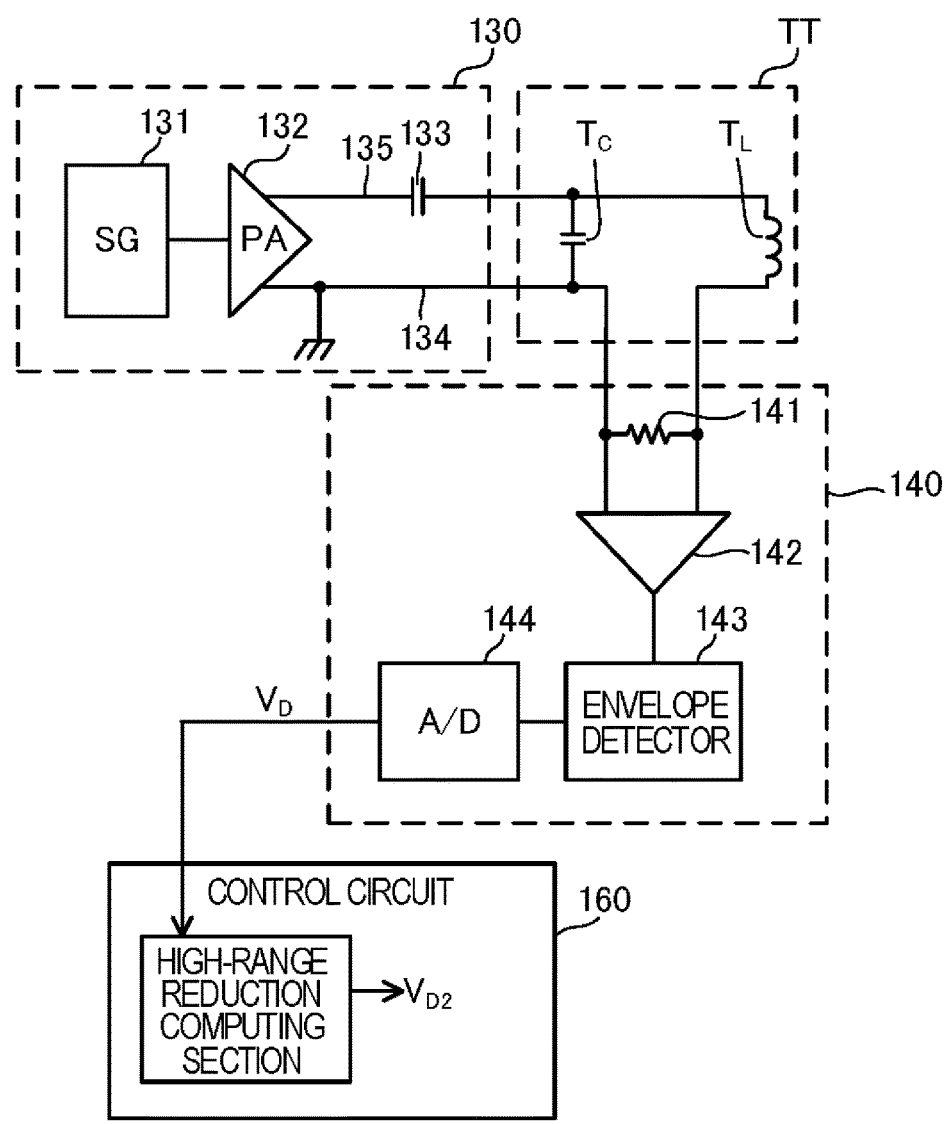
FIG. 28 is a partial block diagram of a power supply device arranged to implement a second high-range reduction method according to the third embodiment of the invention.

With reference to FIG. 28, the second high-range reduction method will be described. In the second high-range reduction method, the load detection circuit 140 described in the first embodiment is used as it is, whereas the high-range reduction-processed voltage value $V_D$ is determined, as a voltage value $V_{D2}$, by performing the high-range reduction process with computations on the voltage value $V_D$ derived from the output signal of the A/D converter 144 in the load detection circuit 140. Then, the voltage value $V_{D2}$ is used as the voltage value $V_D$ in various processes and operations including the foreign-object detection process and the load-state monitoring operation. The voltage value $V_{D2}$ is information (detection result information) obtained by subjecting the amplitude value of a current flowing through the power transmission-side coil $T_L$ to the high-range reduction process with computations. The high-range reduction process with computations can be implemented by a high-range reduction computing section within the control circuit 160. The high-range reduction process with computations may be any arbitrary one only if it allows signal components of relatively low frequencies in an output signal of the A/D converter 144 in the load detection circuit 140 to pass through while it reduces (attenuates) signal components of relatively high frequencies.

In the first or second high-range reduction method, it can be considered that a signal indicative of an amplitude of a current flowing through the power transmission-side coil $T_L$ is inputted to a low-pass filter having a time constant $t_{LPF}$, and a signal indicative of a voltage value $V_{D1}$ or $V_{D2}$ is obtained from the low-pass filter.

In this connection, it is appropriate that the time constant $t_{LPF}$ is set so as to satisfy that $t_{LMAX} < t_{LPF} < t_{FMIN}$. The time $t_{FMIN}$ represents a minimum value of time in which presence of the foreign object 3 on the power supply base 12, if any, should be detected by the control circuit 160, or otherwise represents a minimum value of time in which removal of the electronic device 2 from on the power supply base 12 during power transmission, if any, should be detected by the control circuit 160. The time $t_{FMIN}$ is, for example, one sec. The time $t_{LMAX}$ represents a maximum value of time in which a variation of the output signal of the envelope detector 143 should be disregarded as being due to noise or the like. The time $t_{FMIN}$ is, for example, 0.1 sec.

<<Fourth Embodiment>>

A fourth embodiment of the invention will be described. The fourth embodiment is implemented in combination with the second embodiment. That is, it is assumed as a precondition that the power stabilization circuit 270 of FIG. 22 is mounted on the electronic device 2. In the second embodiment, power reception is executed normally at a maximum power specified by the non-contact power supply system as an example, so that unnecessary power that is not consumed by the load circuit 280 out of received electric power is thrown away as heat. In the fourth embodiment, a method of reducing such waste of electric power will be described.

Figure 29:
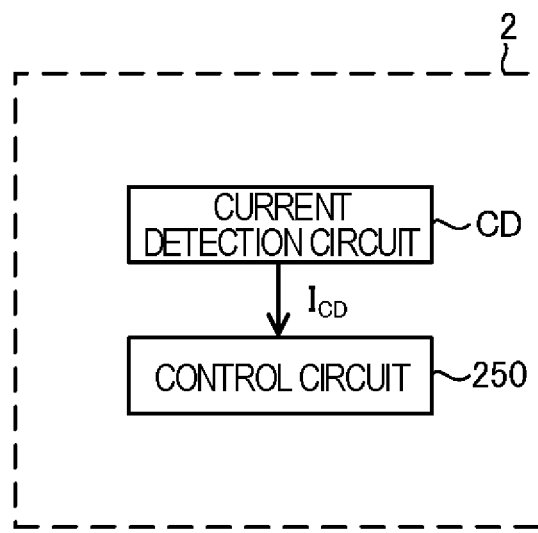
FIG. 29 is a partial block diagram of an electronic device according to a fourth embodiment of the invention.

As shown in FIG. 29, a current detection circuit CD is provided in the electronic device 2 according to the fourth embodiment. The current detection circuit CD detects a value of a current $I_{CD}$ flowing through a specified interconnecting line within the load circuit 280 of FIG. 22, and outputs a signal indicative of a detected value of the current $I_{CD}$ to the control circuit 250. The power consumption of the load circuit 280 depends on the current $I_{CD}$, and increases and decreases of the current $I_{CD}$ cause the power consumption of the load circuit 280 to increase or decrease as well. The current $I_{CD}$ may be an input current (i.e., current $I_{LOAD}$; see FIG. 24) from the power stabilization circuit 270 to the load circuit 280, whereas it is assumed in this case (see FIGS. 23A and 23B) that the current $I_{CD}$ is a charging current from the charging circuit BC to the battery 21 (this is the case also with later-described fifth and sixth embodiments). In this case, normally, the current detection circuit CD is contained in the charging circuit BC.

Figure 30:
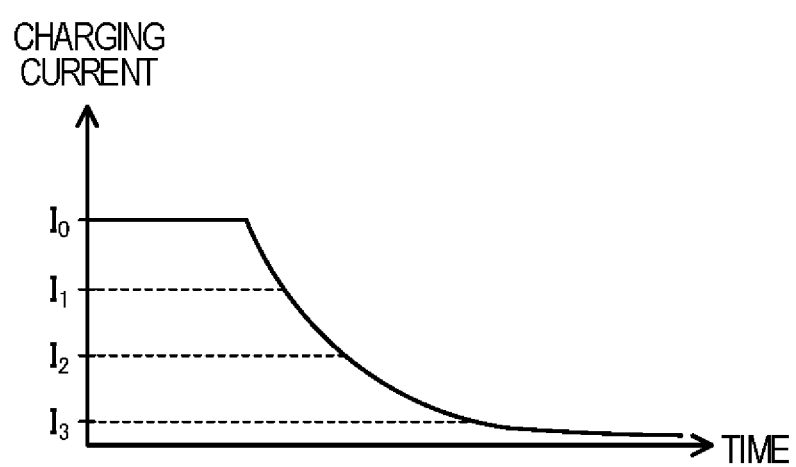
FIG. 30 is a chart representing time variations of a charging current in charging process of a battery mounted on the electronic device.

FIG. 30 represents time variations of a charging current of the battery 21 in charging process of the battery 21. For example, the battery 21 is a lithium ion battery, and the charging circuit BC performs constant-current charging (i.e., charging in which the charging current of the battery 21 is maintained at a constant value) for the battery 21 when an SOC (State Of Charge) of the battery 21 is less than a specified value (e.g., 0.8), and performs constant-voltage charging (i.e., charging in which the terminal voltage of the battery 21 is maintained at a constant value) for the battery 21 when the SOC of the battery 21 is not less than the specified value. The SOC represents a ratio of remaining capacity of the battery 21 to the full charge capacity of the battery 21. The charging current of the battery 21 involved in execution of the constant-voltage charging is not more than the charging current involved in execution of the constant-current charging. In the constant-voltage charging after the SOC of the battery 21 has become a specified value or more, the charging current of the battery 21 decreases more and more toward zero along with elapse of time. The sign $I_0$ represents a value of the charging current of the battery 21 in the constant-current charging, while $I_1$, $I_2$ and $I_3$ represent values of the charging current of the battery 21 in the constant-voltage charging, where $I_0 > I_1 > I_2 > I_3 > 0$.

Figure 31:
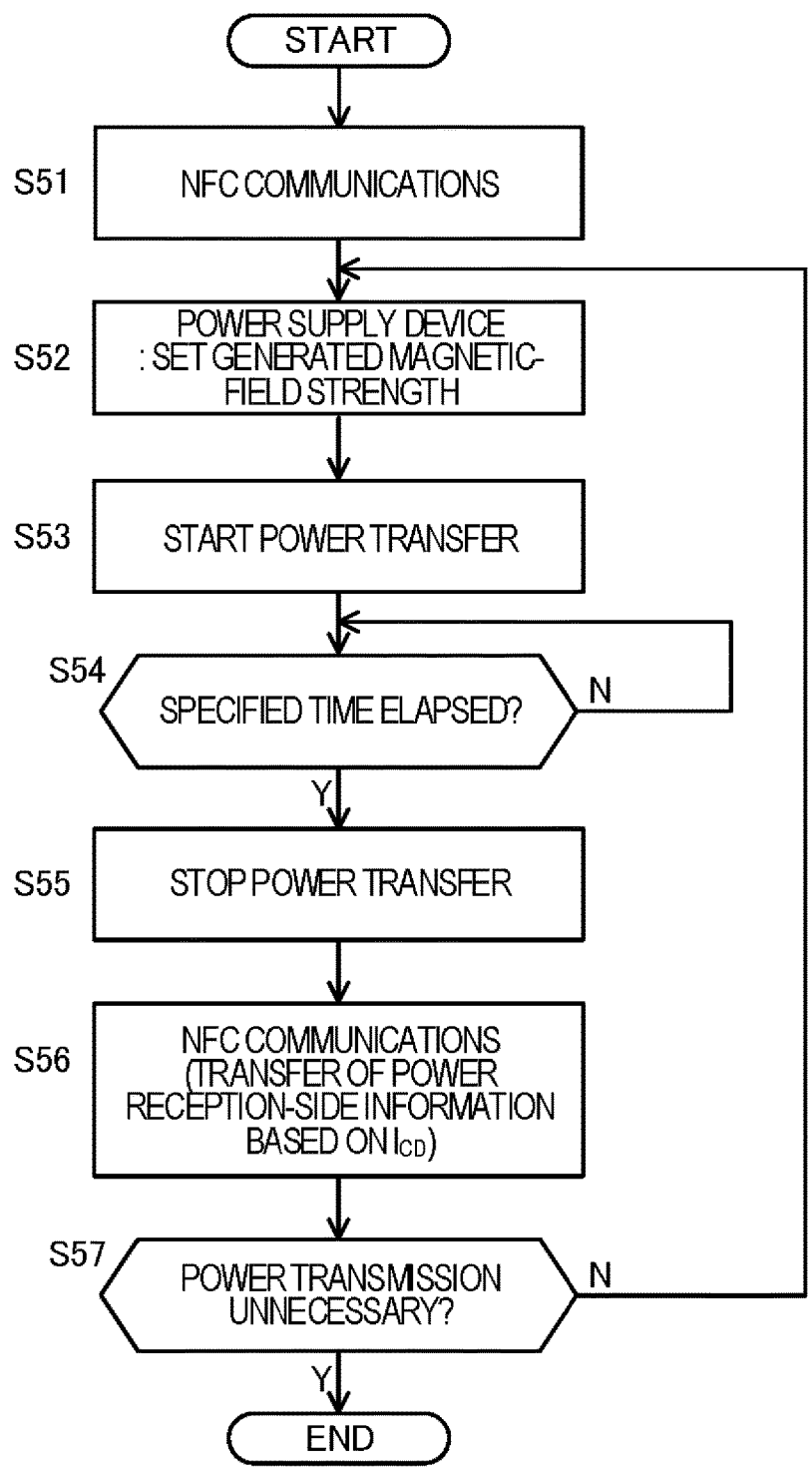
FIG. 31 is an operational flowchart of a non-contact power supply system according to the fourth embodiment of the invention.

FIG. 31 is an operational flowchart of the non-contact power supply system according to the fourth embodiment. First, at step S51, NFC communications are performed between the power supply device 1 and the electronic device 2. The process of step S51 may include transmission and reception of the signals 510 to 540 of FIG. 16, the foreign-object detection process, and transmission and reception of the signals 550 and 560. In addition, in the flowchart of FIG. 31, it is assumed that no foreign object 3 is present on the power supply base 12.

After step S51 and at step S52, the control circuit 160 of the power supply device 1 sets a generated magnetic-field strength of the power transmission-side coil $T_L$ in power transmission operation to be started at later-described step S53. Thereafter, the state of the power supply device 1 and the electronic device 2 is switched over from the communication-mode connection state to the power supply-mode connection state. Then, at step S53, power transfer including power transmission operation and power reception operation by the set magnetic field strength is started. In the first-time step S52, the generated magnetic-field strength of the power transmission-side coil $T_L$ may be set to a predetermined specified strength. Increases and decreases of the generated magnetic-field strength of the power transmission-side coil $T_L$ cause the power-transmission power from the power transmission-side coil $T_L$ to the power reception-side coil $R_L$ to increase and decrease as well. The control circuit 160 is enabled to adjust the generated magnetic-field strength of the power transmission-side coil $T_L$ by adjusting the amplification factor of the amplifier 132 (see FIG. 7) in the power transmission circuit 130. The state of the power supply device 1 and the electronic device 2 is set in the power supply-mode connection state from step S53 until step S55, and otherwise may be in the communication-mode connection state.

After the start of power transfer at step S53, when a specified time (e.g., a few minutes) has elapsed (Y at step S54), the power transfer is stopped at step S55. After the stop of the power transfer, the state of the power supply device 1 and the electronic device 2 is switched over from the power supply-mode connection state to the communication-mode connection state, followed by execution of NFC communications at step S56. At step S56, transmission and reception of the signals 510 to 540 of FIG. 16, the foreign-object detection process, and transmission and reception of the signals 550 and 560 are executed. In step S56, the control circuit 250 of the electronic device 2 makes power reception-side information, which is based on the latest detected value of the current $I_{CD}$, contained in the response signal 520 or 560. The control circuit 160 of the power supply device 1 receives the power reception-side information via the communication circuit 120.

The power reception-side information may be any arbitrary information only if it is responsive to the detected value of the current $I_{CD}$. For example, the power reception-side information may be information indicative of the detected value itself of the current $I_{CD}$, or may be information indicative of a proportional value of the detected value of the current $I_{CD}$, or may be a sign responsive to the detected value of the current $I_{CD}$. In this case, for more concrete explanation's sake, it is assumed that the power reception-side information is the detected value itself of the current $I_{CD}$ (hereinafter, also referred to simply as current value $I_{CD}$).

At step S57 subsequent to step S56, when the current value $I_{CD}$ indicated by the power reception-side information is not more than the specified value, the control circuit 160 decides that the battery 21 has come to a fully charged state (i.e., decides that further power transmission is unnecessary), ending the operation of FIG. 31. Meanwhile, when the current value $I_{CD}$ indicated by the power reception-side information is more than the specified value, the control circuit 160 returns to step S52, followed by repeating the processes of step S52 and followings.

In addition, in step S52 to be executed via step S56, the generated magnetic-field strength of the power transmission-side coil $T_L$ is adjusted and set based on the power reception-side information. In this case, the control circuit 160 adjusts and sets the generated magnetic-field strength of the power transmission-side coil $T_L$ in such a fashion that the generated magnetic-field strength of the power transmission-side coil $T_L$ decreases (i.e., the power-transmission power decreases) more and more with decreasing current value $I_{CD}$ indicated by the power reception-side information, and moreover that the generated magnetic-field strength of the power transmission-side coil $T_L$ increases (i.e., power-transmission power increases) more and more with increasing current value $I_{CD}$ indicated by the power reception-side information. In addition, as can be understood from the charging characteristic of FIG. 30, the direction of variations in current value $I_{CD}$ along with the elapse of time is generally in a decreasing direction.

Further, the increase of the generated magnetic-field strength of the power transmission-side coil $T_L$ is limited to a specified upper-limit strength.

Preferably, the setting of step S52 is performed in order that the generated magnetic-field strength of the power transmission-side coil $T_L$ becomes as small as possible within such a range that the charging of the battery 21 with the current value $I_{CD}$ indicated by the power reception-side information is enabled (i.e., within such a range that the charging current of the current value $I_{CD}$ can be supplied to the battery 21). It is also allowable that table data or the like specifying how to set a generated magnetic-field strength of the power transmission-side coil $T_L$ in response to the current value $I_{CD}$ is preparatorily mounted in the memory 150.

During repetitions of the processes of steps S52 to S57, when the generated magnetic-field strength of the power transmission-side coil $T_L$ has decreased along with a decrease of the current value $I_{CD}$, the power-transmission power from the power transmission-side coil $T_L$ to the power reception-side coil $R_L$ (therefore, power-reception power of the power reception-side coil $R_L$) decreases, so that the output power of the power reception circuit 230 for the power stabilization circuit 270 decreases along with a decrease of the voltage $V_A$ (see FIGS. 22 and 24).

However, since the current necessary for the battery 21 (i.e., charging current) has become smaller, decreases in the output power of the power reception circuit 230 does not matter; conversely, electric power to be thrown away as heat in the second embodiment is eliminated, more efficiently.

In the flow of operations of FIG. 31, power reception-side information is received by the power supply device 1 through NFC communications at a constant period, where at each time of the reception, the generated magnetic-field strength of the power transmission-side coil $T_L$ for subsequent power transfer is adjusted and set. In this case, for example, when a difference between one current value $I_{CD}$ by last-time received power reception-side information and another current value $I_{CD}$ by this-time received power reception-side information is a specified value or less, changing of the generated magnetic-field strength of the power transmission-side coil $T_L$ is not executed.

The operational flowchart of the electronic device 2 in the fourth embodiment may be similar to that of FIG. 19. However, power reception-side information is contained in the response signal 520 of step S203 or the response signal 560 of step S210. The operational flowchart of the power supply device 1 in the fourth embodiment may be similar to that of FIG. 21. However, based on the power reception-side information contained in the response signal 520 or 560, the generated magnetic-field strength of the power transmission-side coil $T_L$ in the power transmission operation to be started at step S114a is preferably adjusted and set before the start of the power transmission operation.

<<Fifth Embodiment>>

A fifth embodiment of the invention will be described. As in the fourth embodiment, the fifth embodiment is also implemented in combination with the second embodiment. That is, it is assumed as a precondition that the power stabilization circuit 270 of FIG. 22 is mounted on the electronic device 2. Also, as in the fourth embodiment, it is assumed that the above-described current detection circuit CD is provided also in the electronic device 2 according to the fifth embodiment.

Figure 32:
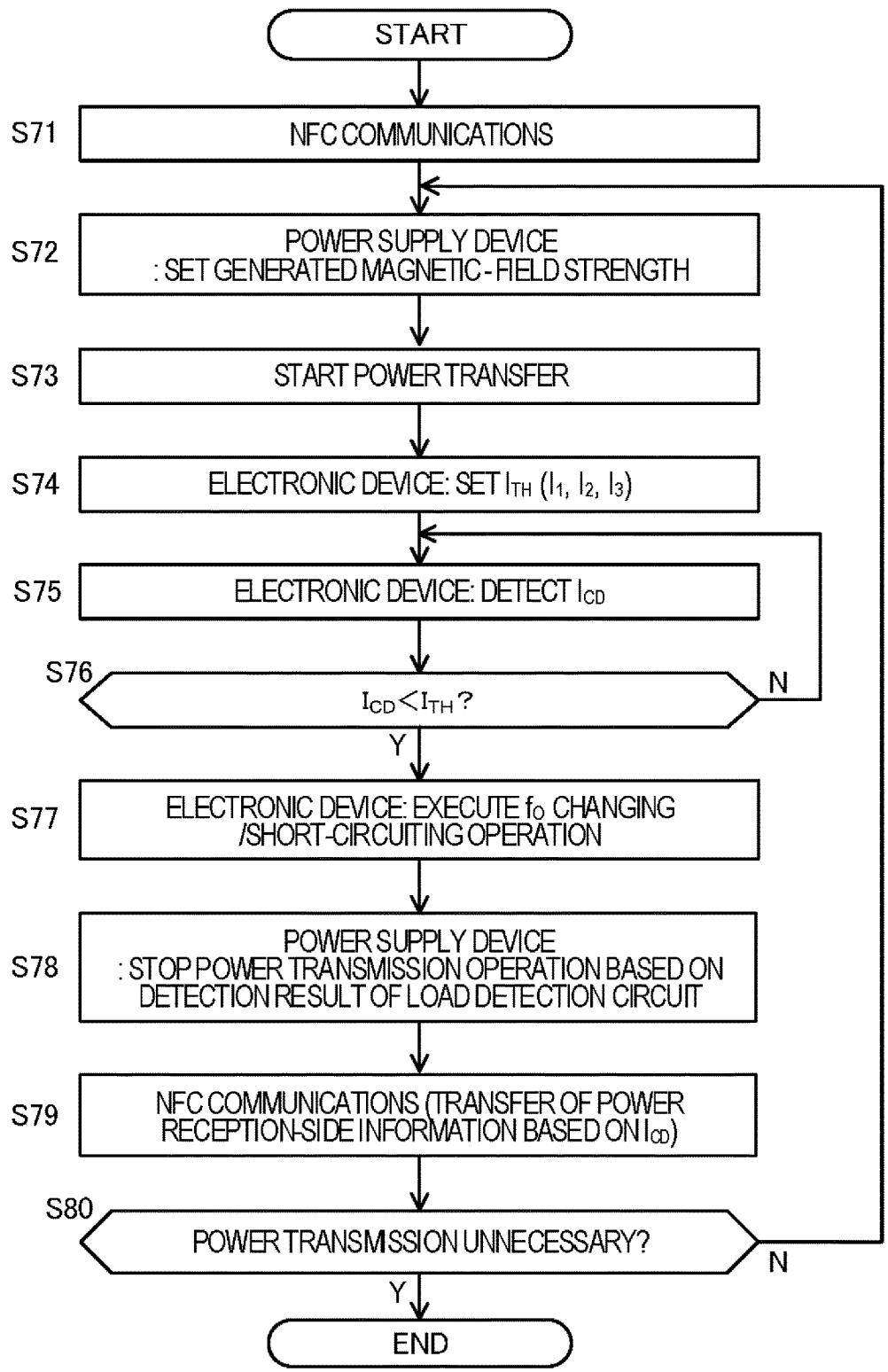
FIG. 32 is an operational flowchart of a non-contact power supply system according to a fifth embodiment of the invention.

FIG. 32 is an operational flowchart of a non-contact power supply system according to the fifth embodiment. First, at step S71, NFC communications are performed between the power supply device 1 and the electronic device 2. The process of step S71 may include transmission and reception of the signals 510 to 540 of FIG. 16, the foreign-object detection process, and transmission and reception of the signals 550 and 560. In addition, in the flowchart of FIG. 32, it is assumed that no foreign object 3 is present on the power supply base 12.

After step S71 and at step S72, the control circuit 160 of the power supply device 1 sets a generated magnetic-field strength of the power transmission-side coil $T_L$ in power transmission operation to be started at later-described step S73. Thereafter, the state of the power supply device 1 and the electronic device 2 is switched over from the communication-mode connection state to the power supply-mode connection state. Then, at step S73, power transfer including power transmission operation and power reception operation by the set magnetic field strength is started. In the first-time step S72, the generated magnetic-field strength of the power transmission-side coil $T_L$ may be set to a predetermined specified strength. The state of the power supply device 1 and the electronic device 2 is set in the power supply-mode connection state from step S73 until step S78, and otherwise may be in the communication-mode connection state.

After the start of power transfer at step S73, at step S74, a threshold value $I_{TH}$ is set by the control circuit 250 of the electronic device 2. The setting of the threshold value $I_{TH}$ may be executed before step S73. At the first time, a current value $I_1$ is set for the threshold value $I_{TH}$ (see FIG. 30). Thereafter, at step S75, a value of the current $I_{CD}$ is detected by the current detection circuit CD of the electronic device 2. At subsequent step S76, the detected current value $I_{CD}$ is compared with the threshold value $I_{TH}$ by the control circuit 250. When $I_{CD} < I_{TH}$ does not hold, the processing flow returns to step S75, followed by repeating the processes of steps S75 and S76; when $I_{CD} < I_{TH}$ holds, the processing flow goes to step S77.

At step S77, the control circuit 250 of the electronic device 2 executes $f_O$ changing/short-circuiting operation by using the resonant-state changing circuit 240. Then, at subsequent step S78, in the power supply device 1, based on a detection result of the load detection circuit 140, the power-transmission permission flag is set to OFF through the load-state monitoring operation (see FIG. 20) by the control circuit 160. As a result, the power transmission operation is stopped. It is noted that the lower-limit value $V_{THL}$ is so determined that the voltage value $V_D$ resulting when the $f_O$ changing/short-circuiting operation is performed in the reference placement state (see FIG. 1B) falls below the lower-limit value $V_{THL}$ of the normal range (step S32 of FIG. 20).

In the electronic device 2, after the $f_O$ changing/short-circuiting operation is executed for a certain period at step S77, the communication circuit 220 is connected to the resonant circuit RR. Meanwhile, in the power supply device 1, after the power transmission operation is stopped at step S78, the communication circuit 120 is connected to the resonant circuit TT. Therefore, during a process after step S78 and leading to step S79, the state of the power supply device 1 and the electronic device 2 is switched over from the power supply-mode connection state to the communication-mode connection state.

At step S79, the control circuit 250 of the electronic device 2 transmits power reception-side information based on the latest detected value of the current $I_{CD}$ to the power supply device 1 by NFC communications. In the power supply device 1, the control circuit 160 receives the power reception-side information via the communication circuit 120. The definition of the power reception-side information is as described in the fourth embodiment.

At step S80 subsequent to step S79, when the current value $I_{CD}$ indicated by the power reception-side information is not more than the specified value, the control circuit 160 decides that the battery 21 has come to the fully charged state (i.e., decides that further power transmission is unnecessary), ending the operation of FIG. 32. Meanwhile, when the current value $I_{CD}$ indicated by the power reception-side information is more than the specified value, the control circuit 160 returns to step S72, followed by repeating the processes of step S72 and followings.

In addition, in step S72 to be executed via step S79, the generated magnetic-field strength of the power transmission-side coil $T_L$ is adjusted and set based on the power reception-side information. In this case, the control circuit 160 adjusts and sets the generated magnetic-field strength of the power transmission-side coil $T_L$ in such a fashion that the generated magnetic-field strength of the power transmission-side coil $T_L$ decreases (i.e., the power-transmission power decreases) more and more with decreasing current value $I_{CD}$ indicated by the power reception-side information, and moreover that the generated magnetic-field strength of the power transmission-side coil $T_L$ increases (i.e., power-transmission power increases) more and more with increasing current value $I_{CD}$ indicated by the power reception-side information. In addition, as can be understood from the charging characteristic of FIG. 30, the direction of variations in current value $I_{CD}$ along with the elapse of time is generally in a decreasing direction. Further, the increase of the generated magnetic-field strength of the power transmission-side coil $T_L$ is limited to a specified upper-limit strength.

Preferably, the setting of step S72 is performed in order that the generated magnetic-field strength of the power transmission-side coil $T_L$ becomes as small as possible within such a range that the charging of the battery 21 with the current value $I_{CD}$ indicated by the power reception-side information is enabled (i.e., within such a range that the charging current of the current value $I_{CD}$ can be supplied to the battery 21). It is also allowable that table data or the like specifying how to set a generated magnetic-field strength of the power transmission-side coil $T_L$ in response to the current value $I_{CD}$ is preparatorily mounted in the memory 150.

Also, in step S74 to be executed via step S78, the threshold value $I_{TH}$ is decreased. More specifically, for example, at the first-time step S74, a current value $I_1$ is set to the threshold value $I_{TH}$, whereas at the second- and third-time step S74, current values $I_2$, $I_3$, respectively, are set to the threshold value $I_{TH}$. When $I_{CD}<I_{TH}$ holds on condition that $I_{TH}=I_3$, the operation of FIG. 32 is ended through the processes of steps S77 to S80. That is, at step S80, when the current value $I_{CD}$ indicated by the power reception-side information is not more than the specified value $I_3$, the control circuit 160 decides that the battery 21 has come to the fully charged state (i.e., decides that further power transmission is unnecessary), ending the operation of FIG. 32. Although the threshold value $I_{TH}$ is set in three steps in the above description, yet the number of steps for setting of the threshold value $I_{TH}$ is any arbitrary one.

The same effects as in the fourth embodiment can be obtained also in the fifth embodiment.

Furthermore, the operational flowchart of the electronic device 2 in the fifth embodiment may be similar to that of FIG. 19. However, it is preferable that power reception-side information is contained in the response signal 520 of step S203 or the response signal 560 of step S210 while the setting process of step S74 in FIG. 32 is contained in the process of step S212 in FIG. 19 and moreover an operation of going to step S214 also when $I_{CD}<I_{TH}$ holds after the start of power reception operation is added. When the processing flow goes to step S214 based on the holding of $I_{CD}<I_{TH}$, the $f_O$ changing/short-circuiting operation is to be performed for a certain period. The operational flowchart of the power supply device 1 in the fifth embodiment may be similar to that of FIG. 21. Preferably, based on the power reception-side information contained in the response signal 520 or 560, the generated magnetic-field strength of the power transmission-side coil $T_L$, during the power transmission operation to be started from step S114a is adjusted and set before the start of the power transmission operation.

<<Sixth Embodiment>>

A sixth embodiment of the invention will be described. As in the fourth embodiment, the sixth embodiment is also implemented in combination with the second embodiment. That is, it is assumed as a precondition that the power stabilization circuit 270 of FIG. 22 is mounted on the electronic device 2. Also, as in the fourth embodiment, it is assumed that the above-described current detection circuit CD is provided also in the electronic device 2 according to the sixth embodiment.

Figure 33:
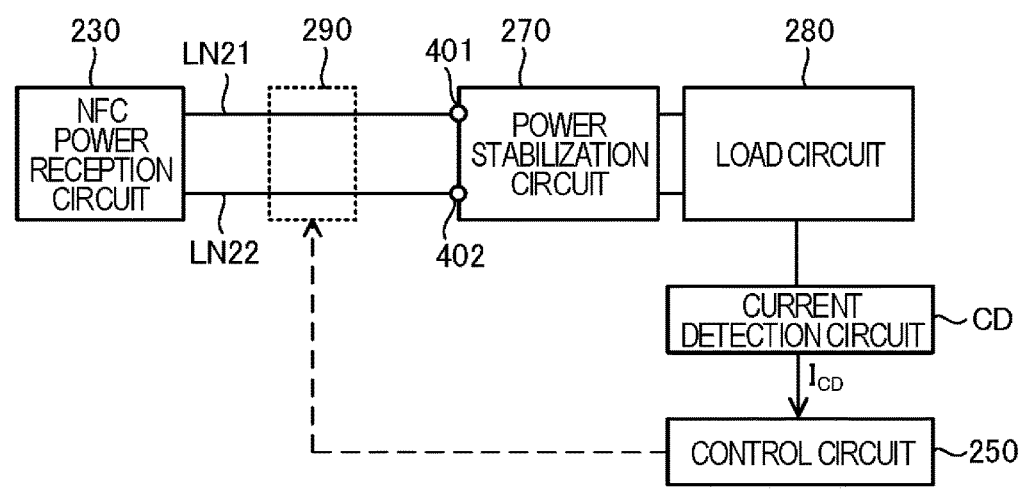
FIG. 33 is a partial block diagram of an electronic device according to a sixth embodiment of the invention.

As shown in FIG. 33, an output voltage of the power reception circuit 230 is supplied to the power stabilization circuit 270 via a pair of lines LN21 and LN22. That is, power-reception power by power transfer is supplied from the power reception circuit 230 to the power stabilization circuit 270 via the pair of lines LN21 and LN22. Out of the lines LN21 and LN22, it is the line LN21 to which a higher potential is applied. That is, with use of the power stabilization circuit 270 of FIG. 24, the line LN21 is connected to the terminal 401 while the line LN22 is connected to the terminal 402. In addition, although the current detection circuit CD is shown outside the load circuit 280 in FIG. 33, the current detection circuit CD may be contained in the load circuit 280 (e.g., charging circuit BC) as described above.

In the electronic device 2 of the sixth embodiment, a load changing circuit 290 is provided between the power reception circuit 230 and the power stabilization circuit 270. The load changing circuit 290 may be provided in the IC 200. The load changing circuit 290 has a function of changing the magnitude of the load in power transmission (i.e., magnitude of the load for the power transmission-side coil $T_L$). Whereas a control signal CNT for controlling the operation of the load changing circuit 290 can be outputted by the control circuit 250 or the current detection circuit CD, the following description is based on the assumption that the control circuit 250 feeds a control signal CNT to the load changing circuit 290 to control the operation of the load changing circuit 290. A specific example of the load changing circuit 290 will be described later.

Figure 34:
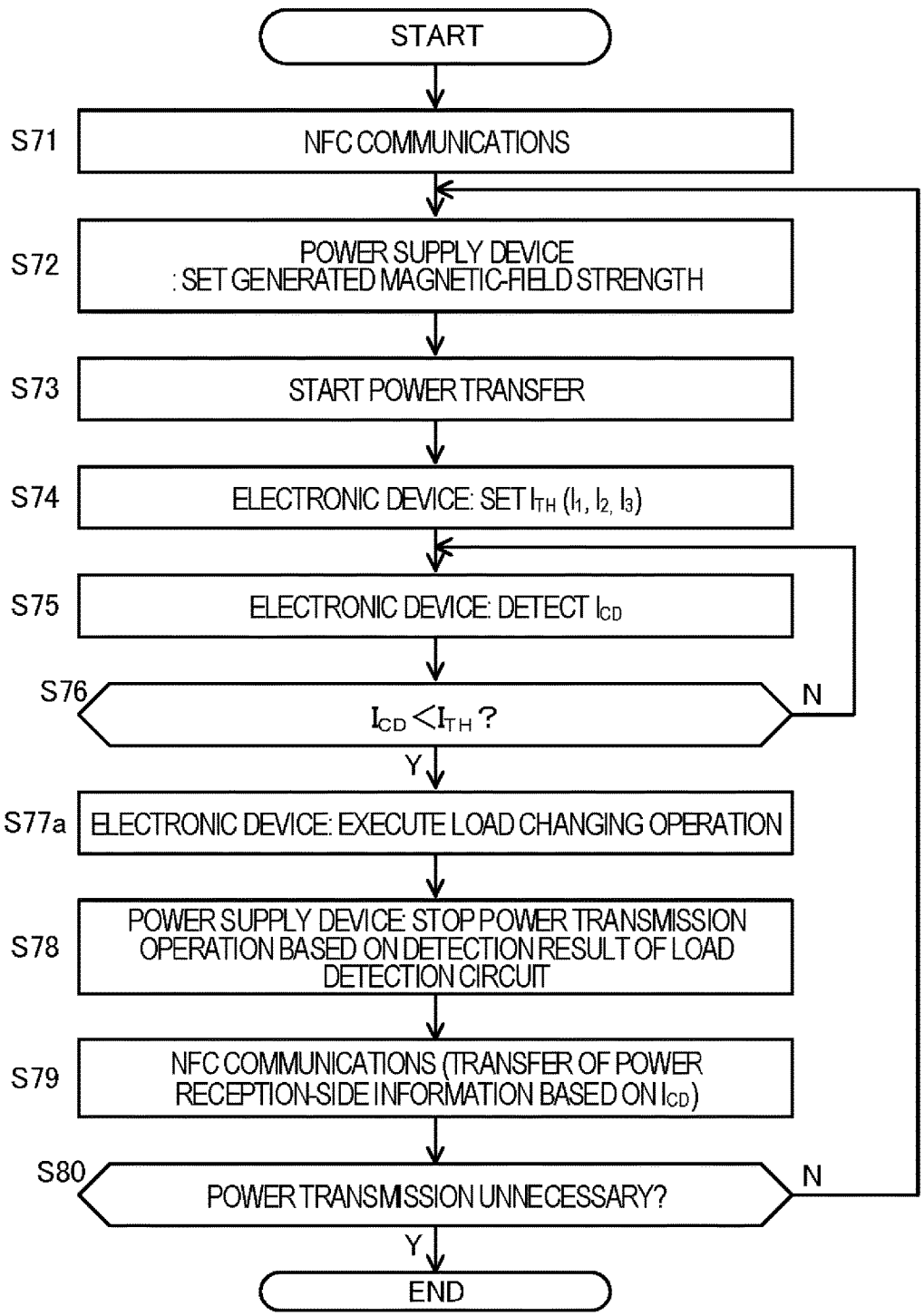
FIG. 34 is an operational flowchart of a non-contact power supply system according to the sixth embodiment of the invention.

FIG. 34 is an operational flowchart of a non-contact power supply system according to the sixth embodiment. On the basis of the operational flowchart described in the fifth embodiment (FIG. 32), in the sixth embodiment, step S77 is replaced with step S77a. Except for this replacement, the operational flowchart of the non-contact power supply system is common between the fifth and sixth embodiments. Description of the common parts will be omitted.

In the sixth embodiment, a current value $I_{CD}$ detected by the current detection circuit CD at step S75 is compared with the threshold value $I_{TH}$ by the control circuit 250 at step S76. When $I_{CD}<I_{TH}$ does not hold, the processing flow returns to step S75, where the processes of steps S75 and S76 are repeated; when $I_{CD}<I_{TH}$ holds, the processing flow goes to step S77a.

At step S77a, the control circuit 250, with use of the load changing circuit 290, executes load changing operation (detailed later) for changing the magnitude of the load in power transmission. Then, at subsequent step S78, in the power supply device 1, based on a detection result of the load detection circuit 140, the power-transmission permission flag is set to OFF by the control circuit 160 through the load-state monitoring operation (see FIG. 20). As a result, the power transmission operation is stopped. In addition, the above-described normal range (step S32 in FIG. 20) is so determined that the voltage value $V_D$ during execution of the load changing operation in the reference placement state (see FIG. 1B) deviates from the normal range.

In the electronic device 2, after execution of the load changing operation for a certain period at step S77a, the communication circuit 220 is connected to the resonant circuit RR. In the power supply device 1, after stop of the power transmission operation at step S78, the communication circuit 120 is connected to the resonant circuit TT. Therefore, during a process after step S78 and leading to step S79, the state of the power supply device 1 and the electronic device 2 is switched over from the power supply-mode connection state to the communication-mode connection state. Processing contents subsequent to step S79 as well as processing contents of the second-time and following steps S72 and S74 to be executed via step S79 are similar to those of the fifth embodiment.

In addition, the operational flowchart of the electronic device 2 in the sixth embodiment may be similar to that of FIG. 19. However, it is preferable that power reception-side information is contained in the response signal 520 of step S203 or the response signal 560 of step S210 while the setting process of step S74 in FIG. 34 is contained in the process of step S212 in FIG. 19 and moreover an operation of going to step S214 also when $I_{CD}<I_{Th}$ holds after the start of power reception operation is added.

When the processing flow goes to step S214 based on the holding of $I_{CD}<I_{TH}$, the load changing operation is to be performed for a certain period. The operational flowchart of the power supply device 1 in the sixth embodiment may be similar to that of FIG. 21. Preferably, based on the power reception-side information contained in the response signal 520 or 560, the generated magnetic-field strength of the power transmission-side coil $T_L$ during the power transmission operation to be started from step S114a is adjusted and set before the start of the power transmission operation.

The control circuit 250 supplies a control signal CNT of high level or low level, selectively, to the load changing circuit 290. When a high-level control signal CNT is given to the load changing circuit 290, the load changing operation by the load changing circuit 290 is executed. When a low-level control signal CNT is given to the load changing circuit 290, the load changing operation by the load changing circuit 290 is stopped. In the flowchart of FIG. 34, the load changing operation is stopped in principle and executed only for a certain period in the above-mentioned step S77a. With a specific circuit of the load changing circuit 290 taken as an example, the load changing operation will be described below.

Example EX 6_1

Figure 35:
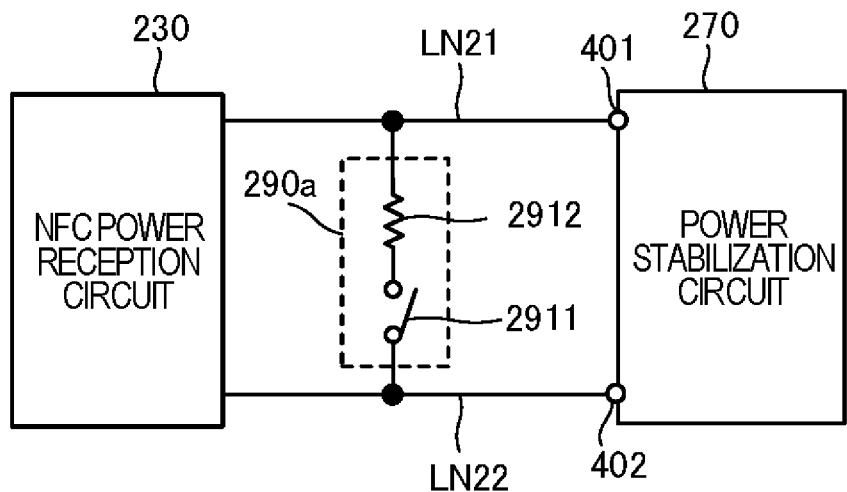
FIG. 35 is a diagram showing an example of the load changing circuit according to the sixth embodiment of the invention.

In Example EX 6_1, a circuit 290a of FIG. 35 is employed as one example of the load changing circuit 290. The circuit 290a is formed of a series circuit composed of a switch 2911 and a resistor 2912, the series circuit being interposed between the lines LN21 and LN22. The switch 2911, which is formed of a semiconductor switching device such as a field effect transistor, is turned ON or OFF in response to the control signal CNT. When a high-level control signal CNT is inputted to the switch 2911, the switch 2911 is turned ON, so that the lines LN21 and LN22 are connected to each other via the resistor 2912. When a low-level control signal CNT is inputted to the switch 2911, the switch 2911 is turned OFF.

With the switch 2911 ON, the load changing operation is executed; with the switch 2912 OFF, the load changing operation is stopped. While the switch 2911 is ON, the circuit 290a causes a decrease in impedance between the pair of power lines (LN21 and LN22) as viewed from the power reception circuit 230, as compared with the case in which the switch 2911 is OFF. The magnitude of the load in power transmission (i.e., magnitude of the load for the power transmission-side coil $T_L$) increases as the impedance between the pair of power lines (LN21 and LN22) decreases.

During the power transfer, increasing magnitude of the load in power transmission causes a decrease in amplitude of the current flowing through the power transmission-side coil $T_L$, which occurrence can be detected by the load detection circuit 140 of the power supply device 1. It is appropriate that the above-mentioned normal range is preparatorily determined and moreover the resistance value of the resistor 2912 is set in order that the voltage value $V_D$ during execution of the load changing operation in the reference placement state (see FIG. 1B) deviates from the normal range (step S32 of FIG. 20) and moreover that the voltage value $V_D$ during non-execution of the load changing operation in the reference placement state falls within the normal range.

Figure 36:
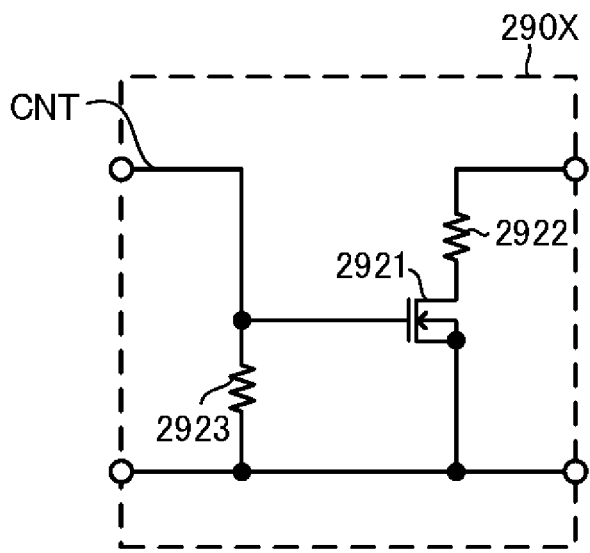
FIG. 36 is a diagram showing a specific circuit configuration of the load changing circuit shown in FIG. 35.

A circuit 290X of FIG. 36 shows a diagram of a specific configuration example of the circuit 290a. The circuit 290X includes a transistor 2921 formed as an n-channel type MOSFET, and resistors 2922 and 2923. The transistor 2921 and the resistor 2922 are capable of functioning as the switch 2911 and the resistor 2912 of FIG. 35. In this case, it is appropriate that the drain of the transistor 2921 is connected to the line LN21 via the resistor 2922, the source of the transistor 2921 is connected to the line LN22, and the control signal CNT is inputted to the gate of the transistor 2921. A gate voltage of the transistor 2921 is applied to the resistor 2923.

Example EX 6_2

Figure 37:
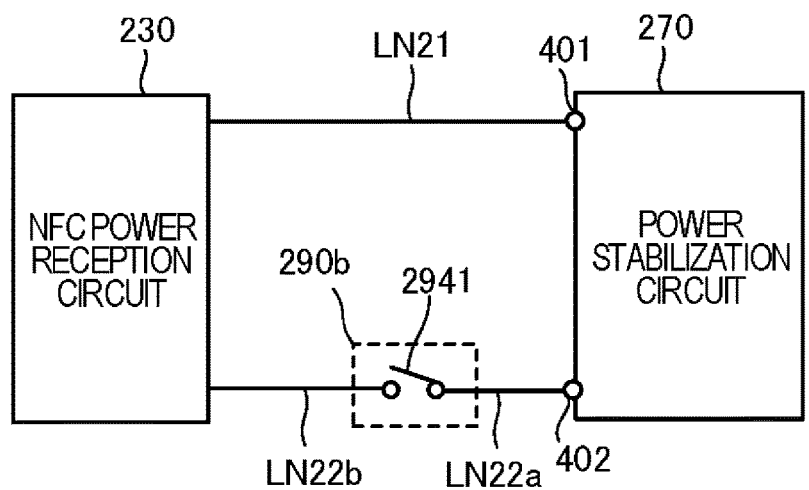
FIG. 37 is a diagram showing another example of the load changing circuit according to the sixth embodiment of the invention.

In Example EX 6_2, a circuit 290b of FIG. 37 is employed as one example of the load changing circuit 290. The circuit 290b is formed of a switch 2941 inserted in series on the line LN22. Out of the line LN22, a line segment between the terminal 402 of the power stabilization circuit 270 and the switch 2941 is referred to as line LN22a, while a line segment between the power reception circuit 230 and the switch 2941 is referred to as line LN22b. The switch 2941, which is formed of a semiconductor switching device such as a field effect transistor, is turned ON or OFF in response to the control signal CNT. When a high-level control signal CNT is inputted to the switch 2941, the switch 2941 is turned OFF, so that the power reception circuit 230 and the power stabilization circuit 270 are shut off from each other. When a low-level control signal CNT is inputted to the switch 2941, the switch 2941 is turned ON, so that the power reception circuit 230 and the power stabilization circuit 270 are connected to each other via the pair of power lines (LN21 and LN22).

With the switch 2941 OFF, the load changing operation is executed; with the switch 2941 ON, the load changing operation is stopped. While the switch 2941 is OFF, the circuit 290b causes an increase in impedance between the pair of power lines (LN21 and LN22) as viewed from the power reception circuit 230, as compared with the case in which the switch 2941 is ON. The magnitude of the load in power transmission (i.e., magnitude of the load for the power transmission-side coil $T_L$) decreases as the impedance between the pair of power lines (LN21 and LN22) increases.

During the power transfer, decreasing magnitude of the load in power transmission causes an increase in amplitude of the current flowing through the power transmission-side coil $T_L$, which occurrence can be detected by the load detection circuit 140 of the power supply device 1. It is appropriate that the above-mentioned normal range is preparatorily determined in order that the voltage value $V_D$ during execution of the load changing operation in the reference placement state (see FIG. 1B) deviates from the normal range (step S32 of FIG. 20) and moreover that the voltage value $V_D$ during non-execution of the load changing operation in the reference placement state falls within the normal range.

Figure 38:
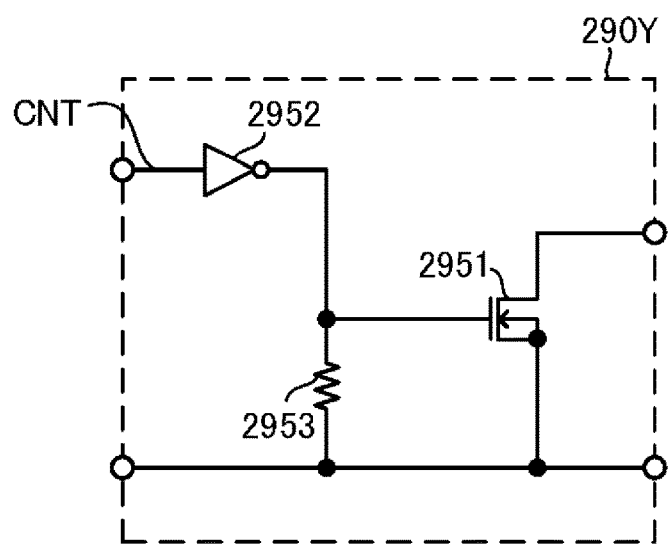
FIG. 38 is a diagram showing a specific circuit configuration of the load changing circuit shown in FIG. 37.

A circuit 290Y of FIG. 38 shows a diagram of a specific configuration example of the circuit 290b. The circuit 290Y includes a transistor 2951 formed as an n-channel type MOSFET, an inverter 2952, and a resistor 2953. The transistor 2951 is capable of functioning as the switch 2941 of FIG. 37. In this case, it is appropriate that the drain of the transistor 2951 is connected to the line LN22a, the source of the transistor 2951 is connected to the line LN22b, and an inverted signal of the control signal CNT (a signal resulting from logical inversion of the control signal CNT) is inputted to the gate of the transistor 2951. The inverter 2952 supplies an inverted signal of the control signal CNT to the gate of the transistor 2951. A gate voltage of the transistor 2951 is applied to the resistor 2953.

The same effects as in the fourth embodiment can be obtained also in the sixth embodiment. In addition, the above-described $f_O$ changing/short-circuiting operation may also be considered as a kind of load changing operation for changing the magnitude of the load in power transmission (i.e., magnitude of the load for the power transmission-side coil $T_L$).

<<Discussions on the Present Invention>>

The present invention as embodied in the above-described first to sixth embodiments will be discussed below.

According to one aspect of the present invention (see, e.g., second embodiment), there is provided a non-contact power supply system capable of transmitting electric power by a magnetic field resonance method from a power transmission device (1) including a power transmission-side resonant circuit (TT) to a power reception device (2) including a power reception-side resonant circuit (RR), wherein the power transmission device includes: a load detection circuit (140) arranged to detect a magnitude of a load in the power transmission; and a control circuit (160) arranged to perform power transmission control based on a detection result of the load detection circuit, and wherein the power reception device includes: a load circuit (280); a power reception circuit (230) arranged to output, toward the load circuit, electric power based on received electric power received by the power reception-side resonant circuit; and a suppressor circuit (270) interposed between the power reception circuit and the load circuit and arranged to suppress variations in output power of the power reception circuit due to variations in power consumption of the load circuit.

By virtue of the arrangement that the control circuit arranged to perform power transmission control based on a detection result of the load detection circuit is provided in the power transmission device, for example when the magnitude of the load in power transmission deviates from the normal range, it becomes possible, by stopping the power transmission, to achieve protection of any foreign object other than the power reception device, suppression of wasteful power consumption, and the like.

However, since the electric power based on the received electric power of the power reception-side resonant circuit is outputted from the power reception circuit toward the load circuit, it follows, given no suppressor circuit, that increases and decreases in the power consumption of the load circuit would cause the magnitude of the load in power transmission to increase and decrease due to increases and decreases in the output power of the power reception circuit. Then, the control circuit, overreacting with variations in power consumption of the load circuit, may malfunction (perform power transmission control that essentially should not be done). For example, when the power consumption of the load circuit has become considerably small, it could be decided, erroneously, that there is no power reception device and the power transmission is stopped. In consideration of such occurrence, the above-described suppressor circuit is provided. As a result, even though the power consumption of the load circuit has varied, variations in output power of the power reception circuit due to those variations are suppressed. Thus, detection results of the load detection circuit are less likely affected by variations in power consumption of the load circuit, so that occurrence of malfunctions can be suppressed.

According to another aspect of the invention (see, e.g., third embodiment), there is provided a non-contact power supply system capable of transmitting electric power by a magnetic field resonance method from a power transmission device (1) including a power transmission-side resonant circuit (TT) to a power reception device (2) including a power reception-side resonant circuit (RR), wherein the power reception device includes: a load circuit (280); and a power reception circuit (230) arranged to output, toward the load circuit, electric power based on received electric power received by the power reception-side resonant circuit, and wherein the power transmission device includes: a load detection circuit (140) arranged to detect a magnitude of a load in the power transmission; and a control circuit (160) arranged to perform power transmission control based on information obtained by subjecting a detection result of the magnitude of the load to high-range reduction process.

By virtue of the arrangement that the control circuit arranged to perform power transmission control based on a detection result of the load detection circuit is provided in the power transmission device, for example when the magnitude of the load in power transmission deviates from the normal range, it becomes possible, by stopping the power transmission, to achieve protection of any foreign object other than the power reception device, suppression of wasteful power consumption, and the like.

In addition, when power transmission control is performed even in response to transient short-time fluctuations in detection results of load magnitude, there could occur malfunctions (power transmission control that essentially should not be done) upon influences of noise or transient load fluctuations. In consideration of such occurrence, power transmission control should be done on the basis of information obtained by performing the high-range reduction process. As a result of this, occurrence of malfunctions due to influences of noise or transient load fluctuations can be suppressed.

The power supply device 1 itself in the above-described individual embodiments may function as the power transmission device according to the present invention, or part of the power supply device 1 in the individual embodiments may function as the power transmission device according to the invention. Similarly, the electronic device 2 itself in the above-described individual embodiments may function as the power reception device according to the invention, or part of the electronic device 2 in the individual embodiments may function as the power reception device according to the invention.

<<Modifications and Others>>

Embodiments of the present invention may be modified in various ways, as required, within the scope of technical concepts defined in the appended claims. The above-described embodiments are only exemplary ones of the invention, and therefore definitions of terms in the present invention or its constituent elements are not limited to those described in the above-described embodiments. Specific numerical values presented in the foregoing description are for illustrative use only and, of course, may be changed to various numerical values. Annotations 1 to 4 are given below as annotations applicable to the above-described embodiments, where contents described in the individual annotations may be combined together in arbitrary combinations unless any contradictions are involved.

(Annotation 1)

In the foregoing embodiments, it is described that frequencies of various signals as well as the resonance frequency are set to 13.56 MHz as the reference frequency. However, the frequency of 13.56 MHz is a target value of setting, and errors are involved in the above-mentioned frequencies in actual devices and equipment.

(Annotation 2)

Since implementations of the present invention in conformity to the NFC standards have been presented in the embodiments, the description has been made based on the reference frequency of 13.56 MHz. However, the reference frequency may be other than 13.56 MHz. In conjunction with this, communications and power transfer between the power supply device and the electronic device, to which the present invention is applied, may be communications and power transfer in conformity to standards other than the NFC standards.

(Annotation 3)

Individual transistors in the above description may be transistors of any arbitrary types. Accordingly, for example, bipolar transistors in the above-described individual circuits may be replaced with MOSFET (Metal-Oxide-Semiconductor Field-Effect Transistor) or other field effect transistors, and vice versa. The above-described individual circuits may be modified such that transistors formed as npn-type bipolar transistors are to be formed as pnp-type bipolar transistors, and vice versa. The above-described individual circuits may be modified such that transistors formed as n-channel type MOSFETs are to be formed as p-channel type MOSFETs, and vice versa.

(Annotation 4)

An object device, which is the power reception device or the power transmission device, according to the present invention may be configured by hardware such as integrated circuits or by a combination of hardware and software. Arbitrary particular functions, which are entirety or part of the functions implemented by the object device, may be described as a program and the program may be stored in flash memory mountable on the object device. Then, the particular functions may be implemented by executing the program on a program execution device (e.g., microcomputer mountable on the object device). The program can be stored and fixed in an arbitrary recording medium. The recording medium in which the program is to be stored and fixed may be mounted on or connected to a device (server device or the like) other than the object device.

LIST OF REFERENCE SIGNS 1 power supply device
2 electronic device
21 battery
130 NFC power transmission circuit
140 load detection circuit
145 high-range reduction circuit
160 control circuit
230 NFC power reception circuit
240 resonant-state changing circuit
250 control circuit
270 power stabilization circuit
280 load circuit
CD current detection circuit
TT power transmission-side resonant circuit
$T_L$ power transmission-side coil
$T_C$ power transmission-side capacitor
RR power reception-side resonant circuit
$R_L$ power reception-side coil
$R_C$ power reception-side capacitor

The invention claimed is:

1. A non-contact power supply system capable of transmitting electric power by a magnetic field resonance method from a power transmission device including a power transmission-side resonant circuit to a power reception device including a power reception-side resonant circuit, wherein
the power transmission device includes:
a load detection circuit arranged to detect a magnitude of a load in the power transmission; and
a control circuit arranged to perform power transmission control based on a detection result of the load detection circuit,
wherein the power reception device includes:
a load circuit;
a power reception circuit arranged to output, toward the load circuit, electric power based on received electric power received by the power reception-side resonant circuit; and
a suppressor circuit interposed between the power reception circuit and the load circuit, and
wherein the suppressor circuit comprises a constant-resistance circuit which comprises two bipolar transistors or MOSFETs forming a current mirror circuit, and the suppressor circuit is arranged to operate such that output power of the power reception circuit is maintained constant even though power consumption of the load circuit varies.

2. The non-contact power supply system according to claim 1, wherein
the load detection circuit is operable to detect an amplitude of a current flowing through a power transmission-side coil forming the power transmission-side resonant circuit to thereby detect the magnitude of the load in the power transmission, and the control circuit is operable so as, during execution of the power transmission, to control continuation or stop of the power transmission in response to detection result information as to the amplitude.

3. The non-contact power supply system according to claim 2, wherein the non-contact power supply system is operable such that when detection result information as to the amplitude deviating from a specified range is obtained during execution of the power transmission, the control circuit stops the power transmission, and otherwise permits continuation of the power transmission.

4. The non-contact power supply system according to claim 3, wherein the detection result information is information obtained by subjecting a detected value of the amplitude to high-range reduction process.

5. The non-contact power supply system according to claim 1, wherein the non-contact power supply system is enabled to perform, in time division, power transfer operation composed of power transmission by the power transmission device and power reception by the power reception device, and communication operation of performing communications between the power transmission device and the power reception device, the power reception device further includes a current detection circuit arranged to detect a value of a current flowing within the load circuit to affect power consumption of the load circuit, and the control circuit of the power transmission device is operable so as, upon receiving power reception-side information responsive to a detection result of the current detection circuit from the power reception device through the communication operation, to adjust a generated magnetic-field strength of the power transmission-side coil in the power transfer operation on a basis of the power reception-side information.

6. The non-contact power supply system according to claim 5, wherein the control circuit of the power transmission device is operable to receive the power reception-side information periodically by the communication operation.

7. The non-contact power supply system according to claim 5, wherein the non-contact power supply system is operable such that:

after the operation of the non-contact power supply system is switched over from the power transfer operation to the communication operation in response to a detected current value of the current detection circuit during the power transfer operation, the power reception-side information is transferred to the power transmission device by communication operation subsequent to the switchover, and the control circuit of the power transmission device, based on the transferred power reception-side information, adjusts a generated magnetic-field strength of the power transmission-side coil in the subsequent power transfer operation.

8. The non-contact power supply system according to claim 5, wherein the load circuit includes a secondary battery, and a charging circuit arranged to charge the secondary battery on a basis of electric power supplied from the power reception circuit via the suppressor circuit, and the current detection circuit is operable to detect a charging current value for the secondary battery.

9. The non-contact power supply system according to claim 1, wherein the load circuit includes a secondary battery, a charging circuit arranged to charge the secondary battery on a basis of electric power supplied from the power reception circuit via the suppressor circuit, and a functional circuit driven by using output power of the secondary battery, and the current detection circuit is operable to detect an input current value for the load circuit.

* * * * *